US012811139B2

(12) United States Patent
Sakuda et al.

(10) Patent No.: US 12,811,139 B2
(45) Date of Patent: Nov. 24, 2026

(54) ION CONDUCTOR AND UTILIZATION THEREOF

(71) Applicant: University Public Corporation Osaka, Osaka (JP)

(72) Inventors: Atsushi Sakuda, Sakai (JP); Yushi Fujita, Sakai (JP); Masahiro Tatsumisago, Sakai (JP); Akitoshi Hayashi, Sakai (JP)

(73) Assignee: UNIVERSITY PUBLIC CORPORATION OSAKA, Osaka (JP)

(*) Notice: Subject to any disclaimer, the term of this patent is extended or adjusted under 35 U.S.C. 154(b) by 570 days.

(21) Appl. No.: 18/549,460

(22) PCT Filed: Mar. 2, 2022

(86) PCT No.: PCT/JP2022/008926
§ 371 (c)(1),
(2) Date: Sep. 7, 2023

(87) PCT Pub. No.: WO2022/191002
PCT Pub. Date: Sep. 15, 2022

(65) Prior Publication Data

US 2024/0162430 A1 May 16, 2024

(30) Foreign Application Priority Data

Mar. 8, 2021 (JP) ................................ 2021-036682

(51) Int. Cl.
*H01M 4/48* (2010.01)
*H01M 10/0525* (2010.01)
*H01M 10/0562* (2010.01)

(52) U.S. Cl.
CPC ......... *H01M 4/48* (2013.01); *H01M 10/0525* (2013.01); *H01M 10/0562* (2013.01); *H01M 2300/0068* (2013.01)

(58) Field of Classification Search
CPC ............... H01M 4/48; H01M 10/0525; H01M 10/0562; H01M 2300/0068;
(Continued)

(56) References Cited

U.S. PATENT DOCUMENTS

| | | | |
|---|---|---|---|
| 6,066,417 | A | 5/2000 | Cho et al. |
| 10,411,293 | B2 * | 9/2019 | Sousa Soares De Oliveira Braga ................ H01M 10/054 |

(Continued)

FOREIGN PATENT DOCUMENTS

| | | | |
|---|---|---|---|
| CN | 107403955 | A | 11/2017 |
| CN | 111211303 | A | 5/2020 |

(Continued)

OTHER PUBLICATIONS

Schroeder, D. J. et al: "Stability of the solid electrolyte Li3OBr to common battery solvents", Materials Research Bulletin 49, pp. 614-617, available online Oct. 13, 2013. See EP Search Report.

(Continued)

*Primary Examiner* — Michael L Dignan
(74) *Attorney, Agent, or Firm* — Stites & Harbison PLLC; Jeffrey A. Haeberlin; Trevor T. Graves

(57) ABSTRACT

An object is to provide a novel oxide-based ion conductor with improved ion conductivity over lithium oxide. The problem is solved by a noncrystalline ion conductor represented by the following formula: $(Li_{2-x}O_{1-x}A_x)_{1-y}Z_y$ (I) (where A is one or more atoms selected from F, Cl, Br, and I, x satisfies $0.1 \leq x \leq 0.7$, Z is a network-forming oxide, a network-modifying oxide (excluding $Li_2O$), or an intermediate oxide, and y satisfies $0 \leq y \leq 0.25$, except for those in which A is I and Z is $SiO_2$ when $0.2 \leq y \leq 0.25$).

13 Claims, 32 Drawing Sheets

(58) Field of Classification Search
CPC ......... H01M 2300/0071; H01M 4/485; H01M 10/052; H01M 4/36; H01M 4/62; C03C 3/23; C03C 4/18; H01B 1/08; C01D 15/00; Y02E 60/10
See application file for complete search history.

(56) References Cited

U.S. PATENT DOCUMENTS

| | | | | |
|---|---|---|---|---|
| 2010/0273062 | A1 | 10/2010 | Tsuchida et al. | |
| 2013/0202971 | A1 | 8/2013 | Zhao et al. | |
| 2019/0131651 | A1 | 5/2019 | Park et al. | |
| 2019/0177207 | A1 * | 6/2019 | Ishioka | H01G 4/30 |
| 2021/0249684 | A1 | 8/2021 | Mezaki et al. | |
| 2022/0081296 | A1 | 3/2022 | Matsubara et al. | |

FOREIGN PATENT DOCUMENTS

| | | | |
|---|---|---|---|
| JP | S60-115169 | A | 6/1985 |
| JP | H11-73993 | A | 3/1999 |
| JP | 2004-331416 | A | 11/2004 |
| JP | 2010-257878 | A | 11/2010 |
| JP | 2016-213181 | A | 12/2016 |
| JP | 2019-513680 | A | 5/2019 |
| WO | 2018/034271 | A1 | 2/2018 |
| WO | 2020090340 | A1 | 5/2020 |
| WO | 2020/203046 | A1 | 10/2020 |

OTHER PUBLICATIONS

European Patent Office, Extended European Search Report issued in corresponding Application No. 22766961.1 dated Apr. 25, 2025.

Japan Patent Office, International Search Report issued in corresponding Application No. PCT/JP2022/008926, mailed on May 10, 2022.

Braga, M.H., et al. "Novel Li3ClO based glasses with superionic properties for lithium batteries," Journal of Materials 1 Chemistry A, Mar. 7, 2014, Issue 15, pp. 5470-5480.

* cited by examiner

ION CONDUCTOR AND UTILIZATION THEREOF

TECHNICAL FIELD

The present invention relates to an ion conductor and utilization thereof.

BACKGROUND ART

In recent years, there has been an increasing demand for lithium-ion secondary batteries for storing electric power in vehicles, such as electric vehicles and hybrid vehicles, and power generation devices, such as solar batteries and wind power generators. Further, from the viewpoint of ensuring safety, all-solid-state batteries, which use a solid electrolyte layer instead of a liquid electrolyte layer, have been actively studied.

The positive electrodes and the negative electrodes of lithium-ion secondary batteries may contain a lithium ion conductor. When a lithium-ion secondary battery is an all-solid-state battery, the solid electrolyte contains a lithium ion conductor.

As an example of an oxide-based lithium ion conductor, Japanese Unexamined Patent Application Publication No. 2016-213181 (Patent Literature 1) discloses an oxide-based lithium ion conductor.

CITATION LIST

Patent Literature

Patent Literature 1: Japanese Unexamined Patent Application Publication No. 2016-213181

SUMMARY OF INVENTION

Technical Problem

In general, solid electrolytes made of oxide-based lithium ion conductors are more stable in the atmosphere than solid electrolytes made of sulfide-based lithium ion conductors, but their ion conductivity is often inferior to that of sulfide-based electrolytes. An object of the present invention is to provide a novel oxide-based ion conductor with improved ion conductivity over lithium oxide.

Solution to Problem

As a result of intensive studies, the inventors of the present invention have found that the above-mentioned object can be attained by using a specific noncystalline ion conductor, leading to the present invention.

Thus, according to the present invention, there is provided a noncrystalline ion conductor represented by formula $(Li_{2-x}O_{1-x}A_x)_{1-y}Z_y$ (I) (where A is one or more atoms selected from F, Cl, Br, and I, x satisfies $0.1 \leq x \leq 0.7$, Z is a network-forming oxide, a network-modifying oxide, or an intermediate oxide, and y satisfies $0 \leq y \leq 0.25$).

In addition, according to the present invention, there is provided an ion conductive composite comprising a first phase composed of the above-mentioned noncrystalline ion conductor and a second phase composed of a crystalline ion conductor having a chemical composition represented by the above formula.

Further, according to the present invention, there is provided an electrode active material comprising the noncrystalline ion conductor or the ion conductive composite as a major component.

Further, according to the present invention, there is provided a solid electrolyte comprising the noncrystalline ion conductor or the ion conductive composite as a major component.

Further, according to the present invention, there is provided a secondary battery including the electrode as a positive electrode or a negative electrode.

Further, according to the present invention, there is provided a method for producing the noncrystalline ion conductor or the ion conductive composite, comprising mechanochemically treating lithium oxide $Li_2O$, LiA (where A is synonymous with the A in the formula (I)), and optionally one or more oxides Z (where Z is synonymous with the Z in the formula (I)).

Advantageous Effects of Invention

According to the present invention, a novel oxide-based ion conductor can be provided.

DESCRIPTION OF EMBODIMENTS

Figure 1:
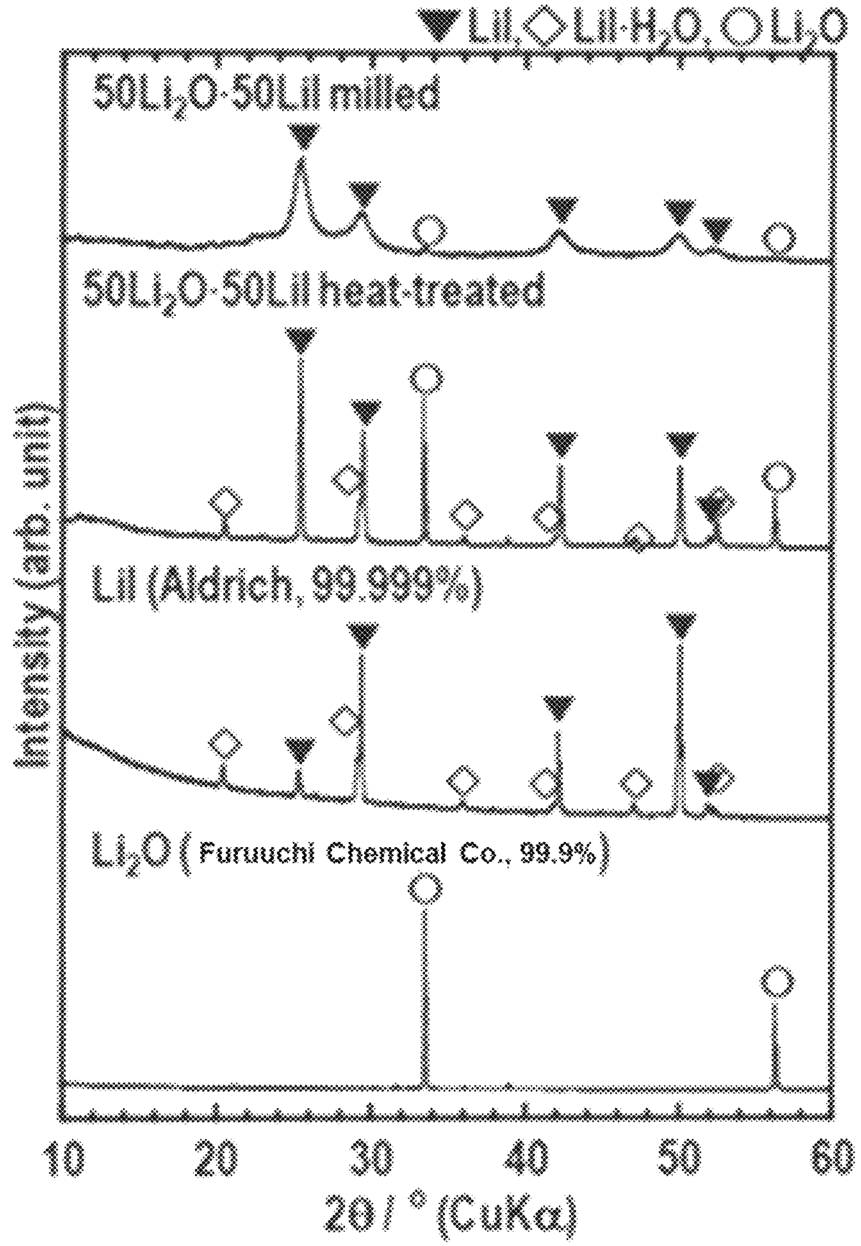
FIG. 1 shows XRD patterns of $50Li_2O\cdot 50LiI$ and $50Li_2O\cdot 50LiI$ (heat treated).

In the present specification, "a to b" (a and b are specific values) means "a" or more and "b" or less unless otherwise specified.

(Ion Conductor)

There are two types of ion conductors: crystalline and noncrystalline (amorphous). The term "noncrystalline" here refers to a state with no clear crystallinity, which is the same as what is generally recognized by those skilled in the art as amorphous. For example, it may refer to a state in which no peak is confirmed in XRD (X-ray diffraction) using CuKα rays, or a state in which the minimum 2θ peak in XRD has a half-value width (full width at half maximum) of 1.0 or more.

In a specific embodiment, the noncrystalline ion conductor of the present invention can be represented by the following formula:

$$(Li_{2-x}O_{1-x}A_x)_{1-y}Z_y \qquad (I)$$

(where A is one or more atoms selected from F, Cl, Br, and I, x satisfies $0.1 \le x \le 0.7$, Z is a network-forming oxide, a network-modifying oxide, or an intermediate oxide, and y satisfies $0 \le y \le 0.25$).

A is not particularly limited as long as it is one or more atoms selected from the group consisting of F, Cl, Br, and I, but A is preferably selected from Cl, Br, and I, more preferably selected from Br and I, and more preferably I. One kind of A may be selected, or multiple kinds of A may be selected.

When $0.2 \le y \le 0.25$, A is preferably selected from the group consisting of F, Cl, and Br, more preferably from the group consisting of Cl and Br, and more preferably Br.

x in the formula can take any value of 0.1 or more and 0.7 or less, for example. The range of x can be, for example, a range defined by any combination of upper and lower limits selected from the values of 0.70, 0.699, 0.69, 0.68, 0.67, 0.667, 0.66, 0.65, 0.64, 0.63, 0.62, 0.61, 0.60, 0.59, 0.58, 0.57, 0.56, 0.55, 0.525, 0.50, 0.475, 0.45, 0.425, 0.40, 0.375, 0.35, 0.333, 0.325, 0.3, 0.275, 0.25, 0.245, 0.24, 0.23, 0.22, 0.21, 0.205, 0.20, 0.19, 0.18, 0.17, 0.16, 0.15, 0.14, 0.13, 0.12, 0.11, 0.105, and 0.10. Among these, x is preferably in the range of 0.1 to 0.67, more preferably in the range of 0.1 to 0.65, more preferably in the range of 0.1 to 0.6, more preferably in the range of 0.1 to 0.55, and more preferably in the range of 0.1 to 0.5.

In the formula, Z is a network-forming oxide, a network-modifying oxide (excluding $Li_2O$), or an intermediate oxide. Here, the network-forming oxide is an oxide that can form a glass network by itself, the network-modifying oxide is an oxide that does not form a glass network by itself but can penetrate into the network and can change the properties of the glass, and the intermediate oxide is an oxide that participates in formation of the network only when present together with a network-modifying oxide or that does not participate in the formation of the network but can penetrate into the network and can change the properties of the glass.

Examples of the network-forming oxide include $B_2O_3$, $SiO_2$, $GeO_2$, $P_2O_5$, $As_2O_5$, $Sb_2O_3$, $Bi_2O_3$, $P_2O_3$, $V_2O_3$, $V_2O_5$, $Ga_2O_3$, $Sb_2O_5$, $As_2O_3$, and $Nb_2O_5$. Examples of the network-modifying oxide include $K_2O$, $Na_2O$, CaO, MgO, SrO, and BaO, and examples of the intermediate oxide include $Al_2O_3$, BeO, ZnO, $ZrO_2$, CdO, SnO, $SnO_2$, PbO, $TiO_2$, $ThO_2$, $Nb_2O_5$, and $Ta_2O_5$. Among these, the network-forming oxide, the network-modifying oxide, or the intermediate oxide is preferably one or more compounds selected from the group consisting of $Al_2O_3$, $B_2O_3$, $GeO_2$, $P_2O_5$, $SiO_2$, and $V_2O_3$, more preferably selected from the group consisting of $Al_2O_3$, $GeO_2$, $P_2O_5$, $SiO_2$, and $V_2O_3$, and more preferably selected from the group consisting of $Al_2O_3$, $SiO_2$, and $V_2O_3$. One kind of Z may be selected, or multiple kinds of Z may be selected. The addition of a network-forming oxide, a network-modifying oxide, or an intermediate oxide can further stabilize the amorphous state of the ion conductor.

When $0.2 \le y \le 0.25$, Z is preferably a network-forming oxide, a network-modifying oxide, or an intermediate oxide other than $SiO_2$, and is more preferably selected from the group consisting of $Al_2O_3$, $B_2O_3$, $GeO_2$, $P_2O_5$, and $V_2O_3$, more preferably from the group consisting of $Al_2O_3$, $GeO_2$, $P_2O_5$, and $V_2O_3$, and more preferably from the group consisting of $Al_2O_3$ and $V_2O_3$. When $0.18 < y \le 0.25$, Z is preferably a network-forming oxide, a network-modifying oxide, or an intermediate oxide other than $SiO_2$, and is more preferably selected from the group consisting of $Al_2O_3$, $B_2O_3$, $GeO_2$, $P_2O_5$, and $V_2O_3$, more preferably from the group consisting of $Al_2O_3$, $GeO_2$, $P_2O_5$, and $V_2O_3$, and more preferably from the group consisting of $Al_2O_3$ and $V_2O_3$.

y in the formula can take any value of 0 or more and 0.25 or less, for example. The range of y can be, for example, a range defined by any combination of upper and lower limits selected from the values of 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.185, 0.19, 0.195, 0.20, 0.205, 0.21, 0.215, 0.22, 0.225, 0.23, 0.235, 0.24, 0.245, and 0.25. Among these, y is preferably in the range of 0 to 0.22, more preferably in the range of 0 to 0.21, more preferably in the range of 0 to 0.20

(more preferably not including 0.20), more preferably in the range of 0 to 0.18, and more preferably in the range of 0 to 0.15.

The noncrystalline ion conductor of the present invention can be expressed by, for example, $Li_{1.9}O_{0.9}I_{0.1}(Li_{1.9}O_9I)$, $Li_{1.8}O_{0.8}I_{0.2}(Li_9O_4I)$, $Li_{1.75}O_{0.75}I_{0.25}(Li_7O_3I)$, $Li_{1.7}O_{0.7}I_{0.3}(Li_{1.7}O_7I_3)$, $Li_{1.667}O_{0.667}I_{0.333}(Li_5O_2I)$, $Li_{1.625}O_{0.625}I_{0.375}(Li_{13}O_5I_3)$, $Li_{1.64}O_{0.64}I_{0.36}(Li_{41}O_{16}I_9)$, $Li_{1.6}O_{0.6}I_{0.4}(Li_5O_3I_2)$, $Li_{1.5}O_{0.8}I_{0.5}(Li_3OI)$, $Li_{1.4}O_{0.4}I_{0.6}(Li_7O_2I_3)$, $Li_{1.333}O_{0.333}I_{0.667}(Li_4OI_2)$, $Li_{1.3}O_{0.3}I_{0.7}(Li_{1.3}O_3I_7)$, $Li_{1.2}O_{0.2}I_{0.5}(Li_6OI_4)$, $Li_{1.667}O_{0.667}Cl_{0.333}(Li_5O_2Cl)$, $Li_{1.5}O_{0.5}Cl_{0.5}(Li_3OCl)$, $Li_{1.333}O_{0.333}Cl_{0.667}(Li_4OCl_2)$, $Li_{1.667}O_{0.667}Br_{0.333}(Li_5O_2Br)$, $Li_{1.8}O_{0.5}Br_{0.5}(Li_3OBr)$, $Li_{1.333}O_{0.333}Br_{0.667}(Li_4OBr_2)$, $Li_{1.667}O_{0.667}F_{0.333}(Li_5O_2F)$, $Li_{1.5}O_{0.5}F_{0.5}(Li_3OF)$, $Li_{1.333}O_{0.333}F_{0.667}(Li_4OF_2)$, $0.97(Li_{1.667}O_{0.667}I_{0.333}(Li_5O_2I))\cdot 0.03Al_2O_3$, $0.9(Li_{1.667}O_{0.667}I_{0.333}(Li_5O_2I))\cdot 0.1Al_2O_3$, $0.8(Li_{1.667}O_{0.667}I_{0.333}(Li_5O_2I))\cdot 0.2Al_2O_3$, $0.97(Li_{1.667}O_{0.667}I_{0.333}(Li_5O_2I))\cdot 0.03B_2O_3$, $0.9(Li_{1.667}O_{0.667}I_{0.333}(Li_5O_2I))\cdot 0.1B_2O_3$, $0.8(Li_{1.667}O_{0.667}I_{0.333}(Li_5O_2I))\cdot 0.2B_2O_3$, $0.97(Li_{1.667}O_{0.667}I_{0.333}(Li_5O_2I))\cdot 0.03GeO_2$, $0.9(Li_{1.667}O_{0.667}I_{0.333}(Li_{502}I)\cdot 0.1\ GeO_2$, $0.8(Li_{1.667}O_{0.667}I_{0.333}(Li_5O_2I))\cdot 0.2\ GeO_2$, $0.97(Li_{1.667}O_{0.667}I_{0.333}(Li_5O_2I))\cdot 0.03P_2O_5$, $0.9(Li_{1.667}O_{0.667}I_{0.333}(Li_5O_2I))\cdot 0.1P_2O_5$, $0.8(Li_{1.667}O_{0.667}I_{0.333}(LiSO_2I))\cdot 0.2P_2O_5$, $0.97(Li_{1.667}O_{0.667}I_{0.333}(Li_5O_2I))\cdot 0.03SiO_2$, $0.9(Li_{1.667}O_{0.667}I_{0.333}(Li_5O_2I))\cdot 0.1SiO_2$, $0.8(Li_{1.667}O_{0.667}I_{0.333}(Li_5O_2I))\cdot 0.2SiO_2$, $0.97(Li_{1.667}O_{0.667}I_{0.333}(Li_5O_2I))\cdot 0.03V_2O_3$, $0.9(Li_{1.667}O_{0.667}I_{0.333}(Li_5O_2I)\cdot 0.1V_2O_3$, $0.8(Li_{1.667}O_{0.667}I_{0.333}(Li_5O_2I))\cdot 0.2V_2O_3$, or the like.

In a specific embodiment, the noncrystalline ion conductor of the present invention can be represented by the following formula:

$$(Li_{2-x}O_{1-x}A_x)_{1-y}Z_y \quad (I)$$

(where A is one or more atoms selected from F, Cl, Br, and I, x satisfies $0.1 \le x \le 0.7$, Z is a network-forming oxide, a network-modifying oxide, or an intermediate oxide, and y satisfies $0 \le y \le 0.25$, except for those in which A is I and Z is $SiO_2$ when $0.2 \le y \le 0.25$). A, x, Z, and y in the formula are as described above.

In a specific embodiment, the noncrystalline ion conductor of the present invention can be represented by the following formula:

$$(Li_{2-x}O_{1-x}A_x)_{1-y}Z_y \quad (I)$$

(where A is one or more atoms selected from F, Cl, Br, and I, x satisfies $0.1 \le x \le 0.7$, Z is a network-forming oxide, a network-modifying oxide, or an intermediate oxide, and y satisfies $0 \le y \le 0.25$, and Z is not $B_2O_3$ when $y > 0.18$, except for those in which A is I and Z is $SiO_2$ when $0.2 \le y \le 0.25$). A, x, Z, and y in the formula are as described above.

In a specific embodiment, the noncrystalline ion conductor of the present invention can be represented by the following formula:

$$(Li_{2-x}O_{1-x}A_x)_{1-y}Z_y \quad (I)$$

(where A is one or more atoms selected from F, Cl, Br, and I, x satisfies $0.1 \le x \le 0.7$, Z is a network-forming oxide, a network-modifying oxide, or an intermediate oxide, and y satisfies $0 \le y \le 0.25$, A is not I and Z is not $SiO_2$ when $0.2 \le y \le 0.25$, and Z is not $B_2O_3$ when $0.18 < y \le 0.25$). A, x, Z, and y in the formula are as described above.

In a specific embodiment, the noncrystalline ion conductor of the present invention can be represented by the following formula:

$$Li_{2-x}O_{1-x}A_x \quad (II)$$

(where A is one or more atoms selected from F, Cl, Br, and I, and x satisfies $0.1 \le x \le 0.7$). A and x in the formula are as described above.

(Ion Conductive Composite)

The present invention provides an ion conductive composite having a first phase composed of a noncrystalline ion conductor represented by formula (I) and a second phase composed of a crystalline ion conductor having a chemical composition represented by formula (I).

The present invention further provides an ion conductive composite having a first phase composed of a noncrystalline ion conductor represented by formula (II) and a second phase composed of a crystalline ion conductor having a chemical composition represented by formula (II).

The ion conductor is as described above. The ion conductive composite is not particularly limited as long as it includes the first phase and the second phase. The content of the first phase in the ion conductive composite can be, for example, 50% by mass or more, 55% by mass or more, 60% by mass or more, 65% by mass or more, 68% by mass or more, 70% by mass or more, 72% by mass or more, 75% by mass or more, 80% by mass or more, 85% by mass or more, 90% by mass or more, 95% by mass or more, or 99% by mass or more, and among these, the content of the first phase in the ion conductive composite is preferably 60% by mass or more, and more preferably 70% by mass or more. The content of the second phase in the ion conductive composite may be, for example, less than 50% by mass, 49% by mass or less, 48% by mass or less, 45% by mass or less, 40% by mass or less, 35% by mass or less, 30% by mass or less, 25% by mass or less, 20% by mass or less, 15% by mass or less, 10% by mass or less, 8% by mass or less, 6% by mass or less, 5% by mass or less, 4% by mass or less, 3% by mass or less, 2.5% by mass or less, 2% by mass or less, 1.5% by mass or less, or 1% by mass or less, and among these, the content of the second phase in the ion conductive composite is preferably 40% by mass or less, and more preferably 30% by mass or less.

The content of the first phase in the ion conductive composite can be calculated from the intensity ratio of the ion conductive composite and a reference sample subjected to X-ray diffraction using, for example, the reference intensity ratio (RIR) method.

The total amount of the first phase and the second phase in the ion conductive composite is preferably 70% by mass or more, preferably 75% by mass or more, preferably 80% by mass or more, preferably 85% by mass or more, and more preferably 90% by mass or more. The ion conductive composite may have a phase other than the first phase and the second phase. The ion conductive composite may have a phase composed of, for example, 1 to 3 atoms or atomic groups selected from the group consisting of Li, O, A (synonymous with A in formula (I)), and Z (synonymous with Z in formula (I)) when $0 < y \le 0.25$, and 1 or 2 atoms or atomic groups selected from the group consisting of Li, O, and A when y=0. The content of the phase other than the first phase and the second phase in the ion conductive composite is, for example, 10% by mass or less, preferably 5% by mass or less, more preferably 2% by mass or less, and more preferably 1% by mass or less. The ion conductive composite may consist of the first phase and the second phase.

The ratio of the first phase to the second phase in the ion conductive composite is not particularly limited, but for example, the mass ratio of the first phase to the second phase is preferably first phase:second phase=1:1 to 999:1, more preferably 4:3 to 999:1, more preferably 3:2 to 999:1, more preferably 2:1 to 999:1, and more preferably 7:3 to 999:1.

The first phase and the second phase in the ion conductive composite may be unevenly distributed, but it is preferable that the second phase is dispersed in the first phase.

(Method for Producing Noncrystalline Ion Conductor and Ion Conductive Composite)

The present invention provides a method for producing a noncrystalline ion conductor or an ion conductive composite, which includes a step of reacting $Li_2O$, LiA (A is one or more atoms selected from F, Cl, Br, and I), and optionally one or more oxides Z (Z is synonymous with Z in formula (I)) so as to form the noncrystalline ion conductor represented by formula (I).

Examples of the reaction step include a mechanochemical treatment step. The mechanochemical treatment step may be a wet method or a dry method, but the dry method is preferred.

The treatment apparatus for the mechanochemical treatment is not particularly limited as long as it is capable of mixing while applying mechanical energy, and for example, a ball mill, a bead mill, a jet mill, a vibration mill, a disk mill, a turbo mill, mechano-fusion, and the like can be used. The ball mill is preferable because large mechanical energy can be obtained. Among ball mills, a planetary ball mill is preferable because the pot rotates on its own axis and the base plate revolves in the opposite direction to the rotation so that high impact energy can be efficiently generated. The treatment conditions for the mechanochemical treatment can be appropriately set in accordance with the treatment apparatus to be used. For example, when a planetary ball mill is used, the conditions are, for example, a ball diameter of 4 to 10 mm, a rotation speed of 50 to 600 rotations per minute, a treatment time of 0.1 to 100 hours, and 1 to 100 kWh per kg of raw material. Of these, the treatment time is preferably 30 hours or more, and more preferably 50 hours or more.

It is preferable that the treatment is performed in an inert atmosphere (for example, an argon atmosphere) using a glove box or the like in an environment having a moisture concentration of 1000 ppm or less and an oxygen concentration of 1000 ppm or less. When the raw material contains water of crystallization, it is preferable to heat-treat the raw material in advance.

(Electrode Active Material)

The present invention provides an electrode active material containing the noncrystalline ion conductor or ion conductive composite of the present invention as a major component. The electrode active material may consist only of the noncrystalline ion conductor or ion conductive composite of the present invention, but may also contain a binder, a conductive material, a known solid electrolyte, or the like.

Containing the noncrystalline ion conductor or ion conductive composite as a major component means that the electrode active material contains 60% by mass or more of the noncrystalline ion conductor or ion conductive composite with respect to the total mass of the electrode active material. The mass percentage of the noncrystalline ion conductor or ion conductive composite is preferably 70% by mass or more, more preferably 75% by mass or more, more preferably 80% by mass or more, more preferably 90% by mass or more, and more preferably 95% by mass or more with respect to the total mass of the electrode active material.

The binder is not particularly limited as long as it is a binder generally used in the relevant field (in particular, the field of electrode materials or the field of batteries (in particular, lithium ion batteries)). The binder includes fluorine polymers, polyolefin polymers, poly(meth) acrylic polymers, polyvinyl polymers, polystyrene polymers, polyimide polymers, polyester polymers, cellulose polymers, and polyacrylonitrile polymers. Specific examples include polyvinylidene fluoride (PVDF), polytetrafluoroethylene, polyvinyl alcohol, polyvinyl acetate, polymethyl methacrylate, polyethylene, polypropylene, styrene butadiene rubber, acrylonitrile butadiene rubber, polyimide, polyamide, carboxymethyl cellulose, polyacrylonitrile, copolymers thereof, and the like.

There are mainly two types of conductive materials: carbon-based conductive materials and metal-based conductive materials. Carbon-based conductive materials include, for example, nanocarbons and fibrous carbons (for example, vapor grown carbon fibers (VGCF) and carbon nanofibers), and more specifically, natural graphite, artificial graphite, acetylene black, Ketchen black, furnace black, and the like. Metal-based conductive materials include, for example, Cu, Ni, Al, Ag, Au, Pt, Zn, Mn, and the like. Of these, carbon-based conductive materials are preferably used, and nanocarbons of acetylene black, furnace black, and Ketchen black are more preferably used. The conductive material may be one kind of conductive material, or may be a combination of a plurality of conductive materials.

The known solid electrolyte is not particularly limited, and solid electrolytes other than that of the present invention used in preparing a secondary battery to be described later can be used.

The amount of each of the binder, the conductive material, and the known solid electrolyte in the electrode active material is 40% by mass or less of the total mass of the electrode active material, preferably 35% by mass or less, more preferably 30% by mass or less, more preferably 20% by mass or less, and more preferably 10% by mass or less. The range of the content of each of the binder, the conductive material, and the known solid electrolyte in the electrode active material can be a range defined by any combination of upper and lower limits selected from 50% by mass, 45% by mass, 40% by mass, 35% by mass, 30% by mass, 25% by mass, 20% by mass, 15% by mass, 10% by mass, 8% by mass, 6% by mass, 5% by mass, 4% by mass, 3% by mass, 2.5% by mass, 2% by mass, 1.5% by mass, 1% by mass, 0.75% by mass, 0.5% by mass, 0.4% by mass, 0.3% by mass, 0.2% by mass, and 0.1% by mass. For example, the range of the content of each of the binder, the conductive material, and the known solid electrolyte in the electrode active material can be 0.1 to 50% by weight.

(Electrode)

The present invention provides an electrode containing the noncrystalline ion conductor, the ion conductive composite, or the electrode active material of the present invention as a major component. The electrode of the present invention may consist only of the noncrystalline ion conductor, ion conductive composite, or electrode active material of the present invention, but may also contain a binder, a conductive material, a known solid electrolyte, or the like. As the binder and the conductive material, those described above can be used. As the known solid electrolyte, solid electrolytes other than that of the present invention used in preparing a secondary battery to be described later can be used.

Containing the noncrystalline ion conductor, ion conductive composite, or electrode active material as a major component means that the electrode contains 60% by mass or more of the noncrystalline ion conductor, ion conductive composite, or electrode active material of the present invention with respect to the total mass of the electrode active material. However, the final amount of the noncrystalline ion conductor in the electrode should be more than 50% by mass with respect to the total mass of the electrode. The mass ratio of the noncrystalline ion conductor, ion conductive composite, or electrode active material of the present invention is preferably 70% by mass or more of the total mass of the electrode active material, more preferably 75% by mass or more, more preferably 80% by mass or more, more preferably 90% by mass or more, and more preferably 95% by mass or more.

A known electrode active material may be added to the electrode of the present invention as necessary. Examples of the known electrode active material include, for example, $Li_4Ti_5O_{12}$, $LiCoO_2$, $LiMnO_2$, $LiVO_2$, $LiCrO_2$, $LiNiO_2$, $Li_2NiMn_3O_8$, $LiNi_{1/3}Co_{1/3}Mn_{1/3}O_2$, $LiFeO_2$, $Li_3V_2(PO_4)_3$, $LiMn_2O_4$, and the like when the electrode is a positive electrode. When the electrode is a negative electrode, examples of the negative electrode active material include carbon-based materials such as natural graphite, artificial graphite, acetylene black, Ketchen black, furnace black, and VGCF, metals such as Si, Li alloys, Na alloys, Au, Pt, Pd, Ag, Al, Bi, Sn, Sb, Zn, Mg, K, Ca and Na, various transition metal oxides such as $Li_{4/3}Ti_{5/3}O_4$, $Li_3V_2(PO_4)_3$, and SnO, and the like. These negative electrode active materials may be used alone or in combination of two or more. The content of the known electrode active material is preferably 20% by mass or less of the total mass of the electrode, more preferably 10% by mass or less.

The electrode may be coated with a material such as $LiNbO_3$, $NaNbO_3$, $Al_2O_3$, or NiS. These electrodes may be used alone or in combination of two or more.

The electrode can be obtained in the form of a pellet by, for example, pressing an electrode active material, optionally mixed with a binder, a conductive material, an electrolyte, or the like. The pressure of the press may be selected from the pressures in a range of 50 to 2000 MPa, for example.

(Electrode Composite)

The present invention also provides an electrode composite in which a positive electrode and a current collector are combined. The electrode to be combined with the current collector is the electrode of the present invention described above.

The material, shape, and the like of the current collector are not particularly limited as long as the current collector can be combined with the electrode of the present invention and can function as a current collector. The shape of the current collector may be like an even alloy plate or a shape having a hole. The current collector may also be in the form of a foil, a sheet, or a film.

Examples of the material of the current collector include Al, Ni, Cu, Ti, Fe, Co, Ge, Cr, Mo, W, Ru, Pd, stainless steel, steel, and the like. In addition to the above materials, the current collector may be coated with Au or Al. The thickness of the coating is not particularly limited, but is preferably 10 nm to 100 μm. Also, the coating preferably has an even thickness.

The coating method is not particularly limited as long as the current collector can be coated, but the coating can be formed by vapor deposition on the surface using a sputter coater, for example.

The electrode composite of the present invention may be formed by combining parts formed as an electrode and a current collector, respectively, or by directly forming an electrode on a current collector. In the case of the direct formation, an electrode active material may be applied to the surface of the current collector using a known method.

(Solid Electrolyte)

The present invention provides a solid electrolyte containing the noncrystalline ion conductor or ion conductive composite of the present invention as a major component. The solid electrolyte may consist only of the noncrystalline ion conductor or ion conductive composite of the present invention, but may also contain a binder, a conductive material, a known solid electrolyte, or the like. As the binder and the conductive material, those described above can be used. As the known solid electrolyte, solid electrolytes other than that of the present invention used in preparing a secondary battery to be described later can be used.

Containing the noncrystalline ion conductor or ion conductive composite as a major component means that the solid electrolyte contains 60% by mass or more of the noncrystalline ion conductor or ion conductive composite with respect to the total mass of the solid electrolyte. The mass percentage of the noncrystalline ion conductor or ion conductive composite is preferably 70% by mass or more of the total mass of the solid electrolyte, more preferably 75% by mass or more, more preferably 80% by mass or more, more preferably 90% by mass or more, and more preferably 95% by mass or more.

The amount of each of the binder, the conductive material, and the known solid electrolyte in the solid electrolyte is 40% by mass or less of the total mass of the solid electrolyte, preferably 35% by mass or less, more preferably 30% by mass or less, more preferably 20% by mass or less, and more preferably 10% by mass or less. The range of the content of each of the binder, the conductive material, and the known solid electrolyte in the solid electrolyte can be a range defined by any combination of upper and lower limits selected from 50% by mass, 45% by mass, 40% by mass, 35% by mass, 30% by mass, 25% by mass, 20% by mass, 15% by mass, 10% by mass, 8% by mass, 6% by mass, 5% by mass, 4% by mass, 3% by mass, 2.5% by mass, 2% by mass, 1.5% by mass, 1% by mass, 0.75% by mass, 0.5% by mass, 0.4% by mass, 0.3% by mass, 0.2% by mass, and 0.1% by mass. For example, the range of the content of each of the binder, the conductive material, and the known solid electrolyte in the solid electrolyte can be 0.1 to 50% by weight.

(Secondary Battery Including Electrode or Electrode Composite of Present Invention)

The present invention provides a secondary battery including the electrode or electrode composite of the present invention. The secondary battery may be a general lithium ion secondary battery or an all-solid-state secondary battery. The electrode of the present invention can be used as either a positive electrode or a negative electrode.

When the electrode of the present invention is used as a positive electrode, the positive electrode is not particularly limited as long as Li can be exchanged as a mobile ion between the positive electrode and the negative electrode during charging and discharging, and the positive electrode may be used in combination with a known negative electrode. The known negative electrode preferably has a low redox potential, and more preferably has an average charge/discharge potential of 0.7 V or less with respect to the redox potential of Li. When the electrode of the present invention is used as a negative electrode, the negative electrode is not particularly limited as long as Li can be exchanged as a mobile ion between the positive electrode and the negative electrode during charging and discharging, and the negative electrode may be used in combination with a known positive electrode. The known positive electrode preferably has a high redox potential, and more preferably has an average charge/discharge potential of 3.5 V or more with respect to the redox potential of Li. The positive electrode active material used for the known positive electrode and the known negative electrode is composed of the above-described known positive electrode active material or the like. The known positive electrode and negative electrode may be made of only an electrode active material, or may be a mixture of an electrode active material with the aforementioned binder, conductive material, solid electrolyte, or the like.

Electrolyte layers used in secondary batteries can be roughly divided into a type composed mainly of an electrolytic solution and a type composed of a solid electrolyte.

(1) Nonaqueous Electrolyte Layer

The nonaqueous electrolyte layer used in the present invention can be composed of a mixture of a known electrolyte and a nonaqueous solvent.

Examples of the electrolyte include $LiClO_4$, $LiPF_6$, $LiBF_4$, $LiCF_3SO_3$, $LiAsF_6$, $LiB(C_6H_5)_4$, LiCl, LiBr, $CH_3SO_3Li$, $CF_3SO_3Li$, $LiN(SO_2CF_3)_2$, $LiN(SO_2C_2F_5)_2$, $LiC(SO_2CF_3)_3$, $LiN(SO_3CF_3)_2$, and the like.

The nonaqueous solvent is not particularly limited, and examples thereof include carbonates, ethers, ketones, sulfolane-based compounds, lactones, nitriles, chlorinated hydrocarbons, amines, esters, amides, phosphoric acid ester compounds, and the like. Typical examples of these are 1,2-dimethoxyethane, 1,2-diethoxyethane, tetrahydrofuran, 2-methyltetrahydrofuran, ethylene carbonate, vinylene carbonate, methylformate, dimethylsulfoxide, propylene carbonate, acetonitrile, γ-butyrolactone, dimethylformamide, dimethyl carbonate, diethyl carbonate, sulfolane, ethylmethyl carbonate, 1,4-dioxane, 4-methyl-2-pentanone, 1,3-dioxolane, 4-methyl-1,3-dioxolane, diethyl ether, sulfolane, methyl sulfolane, propionitrile, benzonitrile, butyronitrile, valeronitrile, 1,2-dichloroethane, trimethyl phosphate, triethyl phosphate, and the like. These can be used alone or in combination of two or more.

(2) Solid Electrolyte Layer

The solid electrolyte constituting the solid electrolyte layer is not particularly limited, and known solid electrolytes that can be used in all-solid-state secondary batteries can be used. The known solid electrolyte is composed of, for example, a sulfide-based solid electrolyte material or an oxide-based solid electrolyte material. Examples of the sulfide-based solid electrolyte material include $Li_2S—P_2S_5$, $Li_2S—P_2S_5—LiI$, $Li_2S—P_2S_5—LiI—LiBr$, $Li_2S—P_2S_5—Li_2O$, $Li_2S—P_2S_5\text{-}Li_2O{\cdot}LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—GeS_2$, $LiI—Li_2S—P_2O_5$, $LiI—Li_3PO_4—P_2S_5$, $Li_2S—P_2S_5$, $Li_{10}GeP_2S_{12}$, $Li_7P_3S_1I$, $Li_3PS_4$, $Li_{3.25}P_{0.75}S_4$, and the like. These sulfide-based solid electrolyte materials may be used alone or in combination of two or more.

Examples of the oxide-based solid electrolyte material include $Li_2O—B_2O_3—P_2O_3$, $Li_2O—SiO_2$, $Li_2O—P_2O_5$, $Li_5La_5Ta_2O_{12}$, $Li_7La_3Zr_2O_{12}$, $Li_6BaLa_2Ta_2O_{12}$, $Li_{3.6}SI_{0.6}P_{0.4}O_4$, $Li_3BO_3—Li_2SO_4—Li_2CO_3$, and the like. The solid electrolyte of the present invention may also be used. These oxide-based solid electrolyte materials may be used alone or in combination of two or more.

In addition to the above-mentioned solid electrolyte materials, the solid electrolyte layer may include other components used in all-solid-state secondary batteries. Examples the other components include metal oxides such as P, As, Ti, Fe, Zn, and Bi, the above-mentioned binders, and conductive materials.

The solid electrolyte can be formed into a solid electrolyte layer, for example, by being pressed so as to have a predetermined thickness. The pressure of the press may be selected from the pressures in a range of 50 to 2000 MPa.

The method for producing the solid electrolyte layer is not particularly limited as long as the materials of the solid electrolyte can be mixed. As the materials of the solid electrolyte, the above-described materials of the solid electrolyte can be used. As the mixing method, mechanochemical treatment is preferable from the viewpoint of mixing the components more homogeneously. The mechanochemical treatment is the same as above.

(All-Solid-State Secondary Battery Including Solid Electrolyte of Present Invention)

The present invention provides an all-solid-state secondary battery including the solid electrolyte of the present invention. As the electrode, the above-mentioned known positive electrode and negative electrode can be used in combination.

(Method for Producing Secondary Battery)

The present invention also provides a method for producing a secondary battery using the electrode, electrode composite, or solid electrolyte of the present invention.

(I) Lithium-Ion Secondary Battery

To produce a lithium-ion secondary battery, for example, a lithium-ion secondary battery can be obtained by inserting into a battery can a stack of the positive electrode of the present invention and a known negative electrode for lithium-ion secondary batteries, and pouring a mixture of an electrolyte and a nonaqueous solvent into the battery can.

A separator may be used between the positive electrode and the negative electrode. In this case, it is preferable to use a microporous polymer film. Specifically, a separator made of a polyolefin polymer, such as nylon, cellulose acetate, nitrocellulose, polysulfone, polyacrylonitrile, polyvinylidene fluoride, polypropylene, polyethylene, or polybutene, can be used.

The positive electrode, separator, and negative electrode may be stacked or rolled up. The electrode composite of the present invention may be used in place of the positive electrode and the negative electrode.

(II) all-Solid-State Battery

An all-solid-state battery can be obtained, for example, by stacking and pressing the positive electrode and solid electrolyte layer of the present invention and a known negative electrode and current collector to obtain a cell and fixing the cell to a container. Alternatively, an all-solid-state battery can be obtained by stacking and pressing known positive and negative electrodes and current collector to obtain a cell and fixing the cell to a container.

A metal layer selected from Au, Pt, In, Al, Sn, Si, and the like may be provided between the negative electrode and the solid electrolyte layer. Further, the metal layer may be provided between the positive electrode and the solid electrolyte layer. The thickness of the metal layer is preferably 10 nm to 100 μm.

EXAMPLES

Hereinafter, the present invention will be described in more detail by way of Examples and Comparative Examples, but the present invention is not limited in any way by them. In the following Examples and Comparative Examples, $Li_2O$ (99.9% purity) manufactured by Furuuchi Chemical Co., LiOH (99.998% purity) manufactured by Sigma-Aldrich, LiF (99.99% purity) manufactured by Sigma-Aldrich, LiCl (99.998% purity) manufactured by Sigma-Aldrich, LiBr (99.998% purity) manufactured by Sigma-Aldrich, LiI (99.999% purity) manufactured by Sigma-Aldrich, vapor grown carbon fiber (VGCF) manufactured by Showa Denko K.K., In foil manufactured by Furuuchi Chemical Co., Li foil manufactured by Furuuchi Chemical Co., and $Al_2O_3$ (99.8% purity) manufactured by Sigma-Aldrich were used, and LiCl used as a reference material was the same as the above-described one (99.998% purity) manufactured by Sigma-Aldrich.

In the following Examples and Comparative Examples, Pulverisette P-7 manufactured by Fritsch GmbH was used as the planetary ball mill. As the X-ray diffractometer, a fully automatic multi-purpose X-ray diffractometer SmartLab manufactured by Rigaku Corporation was used. For measurement of ion conductivities and electronic conductivities, an impedance analyzer (SI-1260) manufactured by Solartron was used. For sputtering, a quick coater (SC-701Mk II) manufactured by Sanyu Electron Co., Ltd. was used. As the SEM, FE-SEM (ultra-high resolution field emission scanning electron microscope SU8220 manufactured by Hitachi) was used. For the EDS analysis, EMAXEvolution X-Max manufactured by Horiba Ltd. was used. For cold isostatic pressing (CIP), NPa-6003 manufactured by NPa System Co., Ltd. was used. For solid-state NMR measurement, JNM-ECX 400 (400 MHz, 9.4 T) manufactured by JEOR was used. For Raman spectrum measurement, a laser Raman spectrometer LabRAM HR-800 manufactured by Horiba Ltd. was used. For constant current cycle tests, a charge/discharge measurement device (BTS-2004) manufactured by NAGANO & Co., Ltd. was used.

Example 1

(Preparation of Ion Conductor 1)

0.0912 g of $Li_2O$ and 0.4088 g of LiI (0.5 g in total) were weighed to achieve the molar ratio of 1:1. The weighed samples were mixed and subjected to mechanochemical treatment in a planetary ball mill to prepare an ion conductor sample. The treatment was performed in a glove box under an argon atmosphere, and the work was performed in an environment in which the moisture value was −70° C. or higher and the oxygen concentration was 10 ppm or lower (all the work performed in the glove box to be described below was performed under these conditions). The mechanochemical conditions were as follows: 32.5 g of $ZrO_2$ balls having a diameter of 5.0 mm and 0.5 g of the sample were put into a 45 ml $ZrO_2$ pot and treated at 510 rpm for 50 hours. In this way, a $50Li_2O{\cdot}50LiI$ ion conductor was prepared. As another ion conductor, a $66.7Li_2O{\cdot}33.3LiI$ ion conductor was prepared in the same manner as described above except that 0.1543 g of $Li_2O$ and 0.3457 g of LiI (0.5 g in total) were weighed to achieve the molar ratio of 2:1. Hereinafter, when clarifying that the mechanochemical treatment was performed in a ball mill as in Example 1, (milled) is indicated after the composition.

Comparative Example 1

(Preparation of Ion Conductor by Solid Phase Method)

Using $Li_2O$ and LiI, an ion conductor was prepared by a solid phase method according to the following procedure.

0.0912 g of $Li_2O$ and 0.4088 g of LiI (0.5 g in total) were weighed to achieve the molar ratio of 1:1. The weighed samples were crushed and mixed for about 5 to 10 minutes with a mortar and pestle, which were dried at 50° C. for at least half a day. The mixed sample was molded into a pellet having a diameter of 4.0 mm. In order to prevent direct contact between the sample and a quartz tube, the molded pellet was placed in a carbon crucible (outer diameter: 7.0 mm, inner diameter: 5.0 mm), and vacuum-sealed in a quartz ampule (outer diameter: 10.0 mm, inner diameter: 7.9 mm), and heat-treated together with the ampule in a Denken muffle furnace. As the heat treatment conditions, the temperature was raised from room temperature to 300° C. by 5° C. per minute and maintained at 300° C. for 48 hours. Weighing and mortar mixing were performed in a glove box. A $50Li_2O{\cdot}50LiI$ (heat treated) ion conductor was thereby prepared by the solid phase method.

X-ray diffraction (XRD) measurement and AC impedance measurement were performed on $50Li_2O{\cdot}50LiI$ (milled) of Example 1 and $50Li_2O{\cdot}50LiI$ (heat treated) of Comparative Example 1.

SmartLab was used as the X-ray diffractometer, and structural analysis was performed with CuKα rays ($=1.54056\times10^{-10}$ m) at a tube voltage of 45 kV, a tube current of 200 mA, a scanning angle of 2θ=10° to 80°, a sampling interval of 0.02°, and a scanning speed of 100 $min^{-1}$ (all XRD below was performed under these conditions).

The AC impedance was measured by using an impedance analyzer (SI-1260) and preparing a polycarbonate cell as follows.

SKD was used as the current collector, and polycarbonate having an inner diameter of 10 mm was used as the insulating material. A pellet was prepared by weighting 150 mg of each powder sample, adding them into the rod, and molding them by uniaxial pressing at 360 MPa for 5 minutes using a hydraulic press. The pellet was fixed by being crimped together with the shaft and rod with a screw, placed in a glass container, and sealed with a rubber stopper. The measurement frequency was 0.1 Hz to $1\times10^{6}$ Hz, the AC amplitude was 10 mV, the intersection point of the semicircle and the real axis of the obtained impedance plot was defined as the resistance R of the sample, and the ion conductivity a was obtained from the following formula:

$$\sigma=(1/R)\cdot(L/S) \quad (1)$$

L: pellet thickness (cm), S: electrode surface area (0.785 $cm^2$)

Figure 2A:
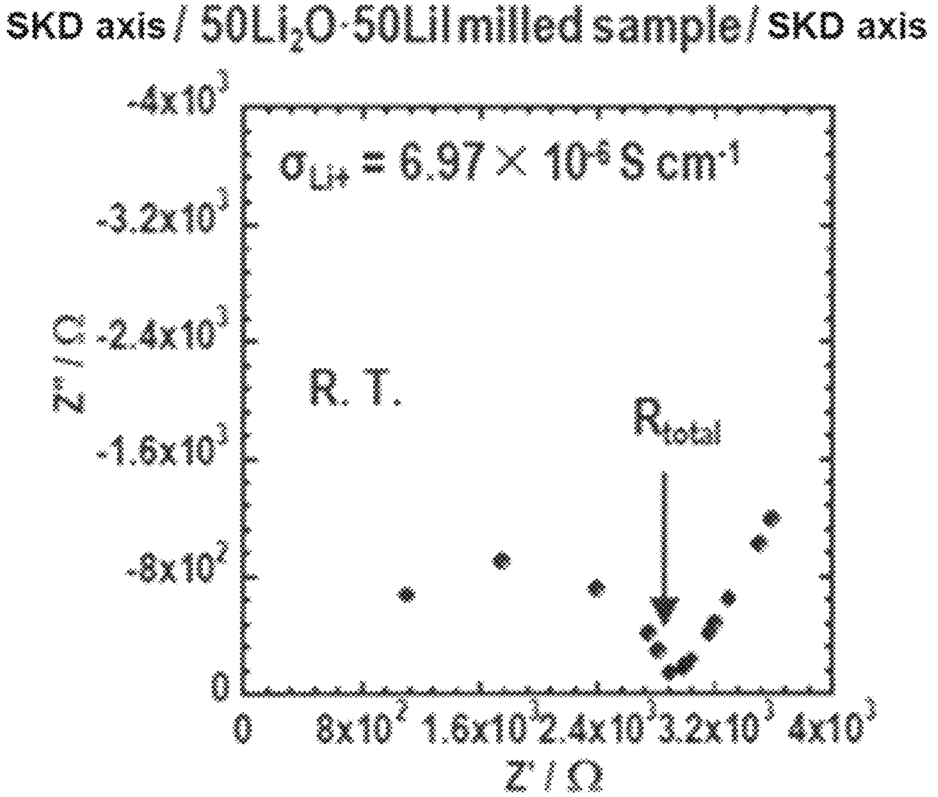
FIG. 2A shows a Nyquist plot of $50Li_2O\cdot 50LiI$ (polycarbonate cell).
Figure 2B:
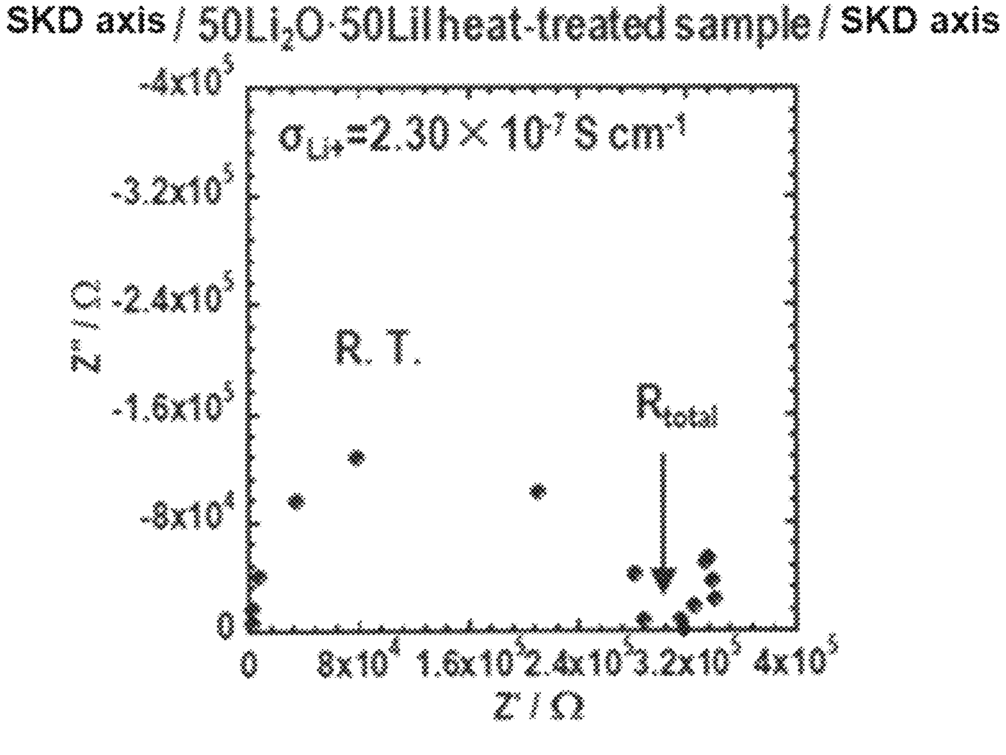
FIG. 2B shows a Nyquist plot of $50Li_2O\cdot 50LiI$ (heat treated).

FIG. 1 shows XRD patterns, FIG. 2A shows a Nyquist plot of $50Li_2O{\cdot}50LiI$ (milled) of Example 1, and FIG. 2B shows a Nyquist plot of $50Li_2O{\cdot}50LiI$ (heat treated) of Comparative Example 1. FIG. 1 shows measurement results of LiI and $Li_2O$ for comparison. It can be seen from FIG. 1 that $50Li_2O{\cdot}50Li$ of Example 1 is in an amorphous state, whereas $50Li_2O{\cdot}50LiI$ (heat treated) of Comparative Example 1 has a sharp peak and is not in an amorphous state. Further, it can be seen from FIGS. 2A and 2B that $50Li_2O{\cdot}50LiI$ of Example 1 has an ion conductivity superior to that of $50Li_2O{\cdot}50LiI$ (heat treated) of Comparative Example 1.

Comparative Example 2

(Preparation of Ion Conductor by Mortar Mixing)

Using $Li_2O$ and LiI, an ion conductor was prepared by mortar mixing according to the following procedure. 0.1543 g of $Li_2O$ and 0.3457 g of LiI (0.5 g in total) were weighed to achieve the molar ratio of 2:1. The weighed samples were mixed for about 5 minutes with a mortar and pestle, which were dried at 100° C. for 24 hours or more. Weighing and mortar mixing were performed in a glove box. A $66.7Li_2O{\cdot}33.3LiI$ (hand mixed) ion conductor was thereby prepared by mortar mixing.

X-ray diffraction (XRD) measurement, AC impedance measurement, and electronic conductivity measurement were performed on $66.7Li_2O{\cdot}33.3LiI$ (milled) of Example 1 and $66.7Li_2O{\cdot}33.3LiI$ (hand mixed) of Comparative Example 2. The AC impedance of $66.7Li_2O{\cdot}33.3LiI$ (milled) of Example 1 was measured by preparing a laminate cell as follows.

A pellet was molded by performing uniaxial pressing on the powder sample at 360 MPa for 5 minutes using a hydraulic press in a glove box. The molded pellet had a diameter of 10 mm and a thickness of 0.7 to 1.1 mm. Au was sputtered on both sides of the pellet using a quick coater (SC-701Mk II) at a current value of 280 mA for 1 minute, and this was used as an electrode. The prepared pellet electrode was vacuum-sealed in a laminate cell. A Ni lead tab and a laminate sheet were overlaid on the cell, and the three sides were bonded by heating with a sealer (NL-202JC-10) manufactured by Ishizaki Electric Mfg. Co., Ltd. Further, in the glove box, the pellet sample was sandwiched between Ni lead tabs and sealed by vacuum sealing. Finally, using a clip, the Ni lead tab and a platinum lead wire in the cylinder were connected to prepare a laminate cell.

The electronic conductivity measurement was performed using DC polarization. For the measurement, the cell used for the ion conductivity measurement was used. For the measurement, an impedance analyzer (SI-1260) manufactured by Solartron was used, the current density and potential obtained after 300 seconds with a measurement frequency of 0.01 Hz were plotted, the slope of the linearly approximated approximation line was taken as the resistance R of the sample, and the electronic conductivity 6 was obtained from the above formula (1).

Figure 3:
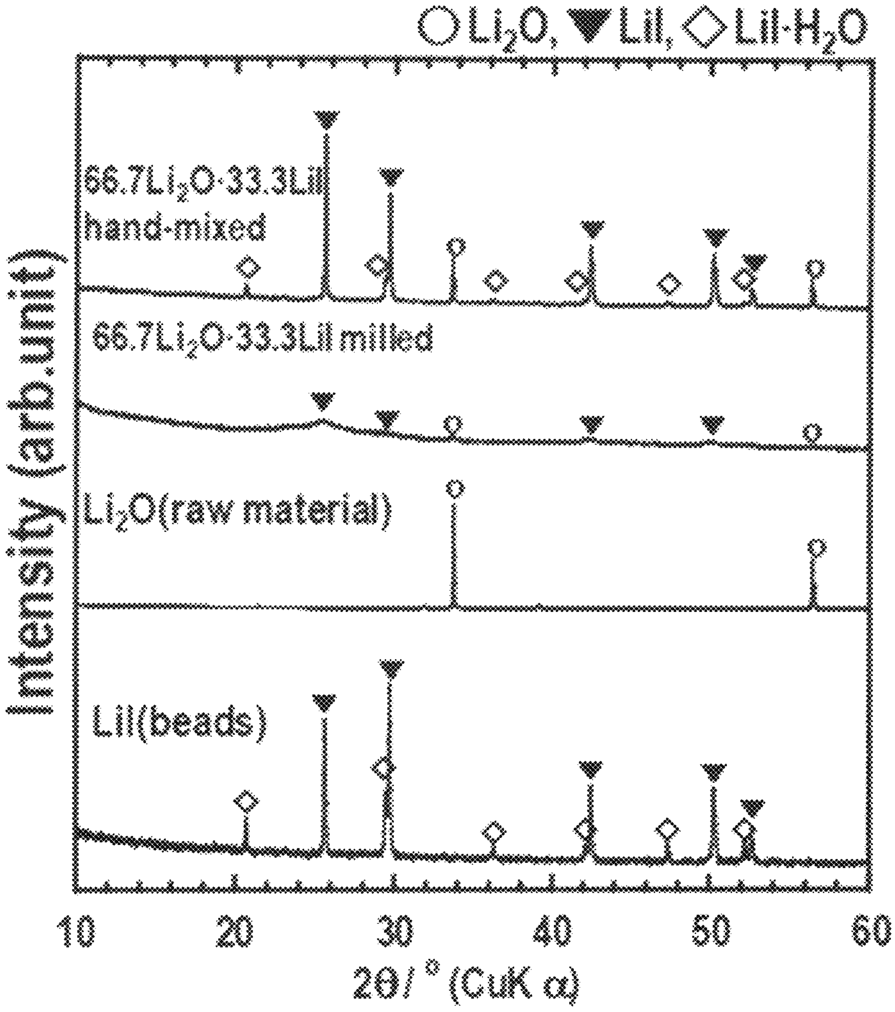
FIG. 3 shows XRD patterns of $50Li_2O\cdot 50LiI$ and $66.7Li_2O\cdot 33.3LiI$ (hand mixed).
Figure 4A:
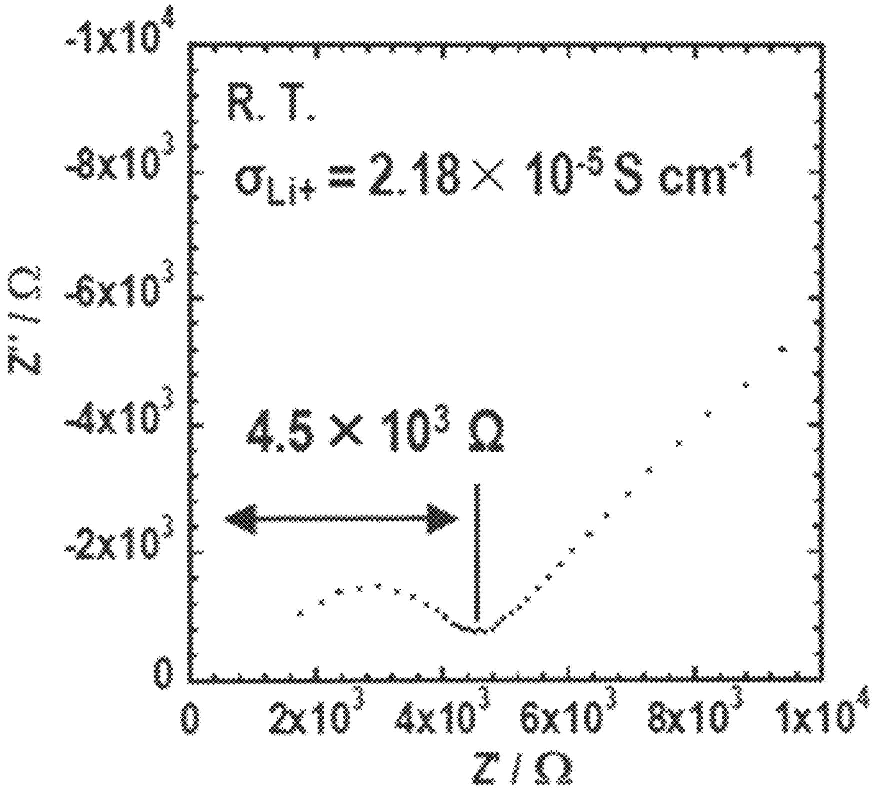
FIG. 4A shows a Nyquist plot of $66.7Li_2O\cdot 33.3LiI$ (milled).
Figure 4B:
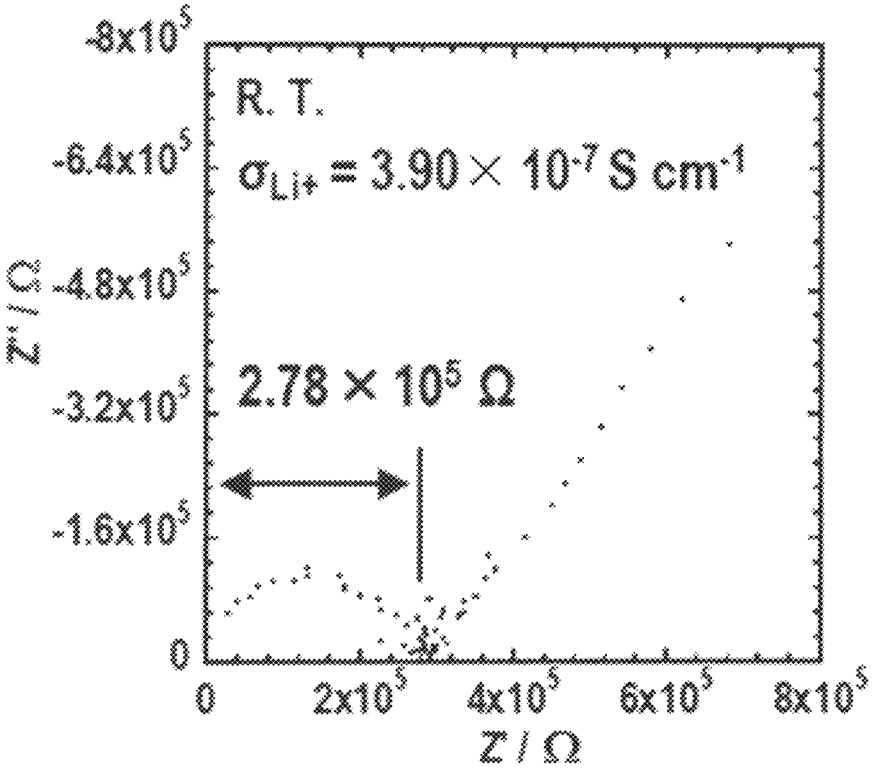
FIG. 4B shows a Nyquist plot of $66.7Li_2O\cdot 33.3LiI$ (hand mixed).

FIG. 3 shows the measured XRD pattern, FIG. 4A shows a Nyquist plot of $66.7Li_2O{\cdot}33.3LiI$ (milled) of Example 1, and FIG. 4B shows a Nyquist plot of $66.7Li_2O{\cdot}33.3LiI$ (hand mixed) of Comparative Example 2. FIG. 3 shows measurement results of LiI and $Li_2O$ for comparison. It can be seen from FIG. 3 that $66.7Li_2O{\cdot}33.3LiI$ (milled) of Example 1 is in an amorphous state, whereas $66.7Li_2O{\cdot}33.3LiI$ (hand mixed) of Comparative Example 2 has a sharp peak and is not in an amorphous state. Further, it can be seen from FIGS. 4A and 4B that $66.7Li_2O{\cdot}33.3LiI$ (milled) of Example 1 has an ion conductivity superior to that of $66.7Li_2O{\cdot}33.3LiI$ (hand mixed) of Comparative Example 2. The electronic conductivities and ion conductors of $66.7Li_2O{\cdot}33.3LiI$ (milled) of Example 1 and $66.7Li_2O{\cdot}33.3LiI$ (hand mixed) of Comparative Example 2 are shown in Table 1 below. Table 1 shows that the ion conductor of the present invention has a low electronic conductivity and a high ion conductivity.

TABLE 1

| | Electronic conductivity | Ion conductivity | Cell constitution | Measurement temperature | Cell |
|---|---|---|---|---|---|
| $66.7Li_2O{\bullet}33.3LiI$ (milled) | $2.45 \times 10^{-10}$ $Scm^{-1}$ | $2.18 \times 10^{-5}$ $Scm^{-1}$ | Ni/Au/$66.7Li_2O{\bullet}33.3LiI$ (milled)/Au/Ni | R.T. | Laminate |
| $66.7Li_2O{\bullet}33.3LiI$ (hand mixed) | $9.38 \times 10^{-9}$ $Scm^{-1}$ | $3.90 \times 10^{-7}$ $Scm^{-1}$ | SKD/$66.7Li_2O{\bullet}33.3LiI$ (hand mixed)/SKD | R.T. | Polycarbonate |

Example 2

(Preparation of Ion Conductor 2)

$Li_2O$ and LiI were weighed and mixed as shown in Tables 2 and 3 below, and each mixture was subjected to mechanochemical treatment in a planetary ball mill to prepare an ion conductor sample. The treatment was performed in a glove box. The mechanochemical conditions were as follows: 32.5 g of $ZrO_2$ balls having a diameter of 5 mm and 0.5 g of the sample were put into a 45 ml $ZrO_2$ pot and treated at 510 rpm for 70 hours. X-ray diffraction (XRD) measurement was performed on each of the prepared ion conductor samples.

TABLE 2

| x | 0 (comparison) | 10 (comparison) | 20 | 25 | 30 | 33.3 |
|---|---|---|---|---|---|---|
| $(100{\bullet}x)Li_2O{\bullet}xLiI$ | $Li_2O$ | $90Li_2O{\bullet}10LiI$ | $80Li_2O{\bullet}20LiI$ | $75Li_2O{\bullet}25LiI$ | $70Li_2O{\bullet}30LiI$ | $66.7Li_2O{\bullet}33.3LiI$ |
| $Li_2O$/g | 0.5 | 0.3338 | 0.2358 | 0.2005 | 0.1712 | 0.1543 |
| LiI/g | 0 | 0.1662 | 0.2642 | 0.2995 | 0.3288 | 0.3457 |

TABLE 3

| x | 37.5 | 40 | 50 | 60 | 70 | 100 (comparison) |
|---|---|---|---|---|---|---|
| $(100{\bullet}x)Li_2O{\bullet}xLiI$ | $62.5Li_2O{\bullet}37.5LiI$ | $60Li_2O{\bullet}40LiI$ | $50Li_2O{\bullet}50LiI$ | $40Li_2O{\bullet}60LiI$ | $30Li_2O{\bullet}70LiI$ | LiI |
| $Li_2O$/g | 0.1356 | 0.1254 | 0.0912 | 0.0648 | 0.0436 | 0 |
| LiI/g | 0.3644 | 0.3746 | 0.4088 | 0.4352 | 0.4564 | 0.5 |

Figure 5:
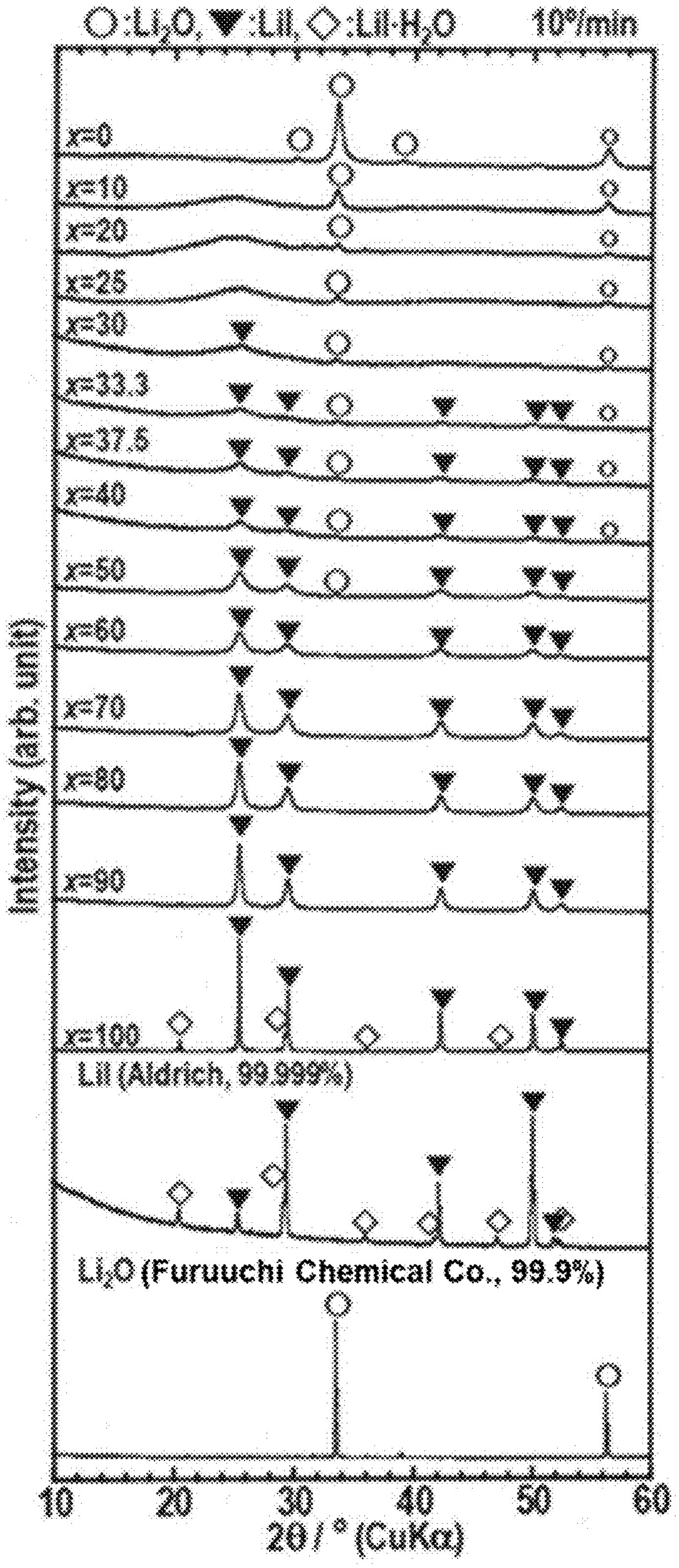
FIG. 5 shows XRD patterns of $(100-x)Li_2O\cdot xLiI$.

The results of the XRD measurement of the samples are shown in FIG. 5. FIG. 5 also shows the measurement results of $Li_2O$ and LiI for comparison. It can be seen from FIG. 5 that, in particular, the samples of x=10 to x=60 contain broad profiles, and the samples are amorphized or contain a large amount of amorphous part. This indicates that an amorphous sample can be prepared by mixing $Li_2O$ and LiI and subjecting the mixture to mechanochemical treatment. In addition, the absence of a $Li_2O$ diffraction peak and the broadening of the peak in the samples of x=60 to x=90 also indicate that the crystallite size was significantly reduced and amorphous components are present in the samples of x=60 to x=90.

The ion conductivity (a) and activation energy ($E_a$) were measured for the samples of x=10, 20, 30, 33.3, 40, and 60. The ion conductivity was measured by preparing the above-mentioned laminated cell (the same was done in the subsequent experiments).

The activation energy was calculated from the following formula on the assumption that the Arrhenius law is followed, based on the slope of the graph of the temperature dependence of the ion conductivity, which plots the reciprocal of the absolute temperature and ion conductivity measured at each temperature.

$$\sigma=A\ \exp(-E_a/RT) \quad (2)$$

[σ=ion conductivity (S $cm^{-1}$), A: pre-exponential factor (S $cm^{-1}$), T: measurement temperature (K), $E_a$: activation energy (kj $mol^{-1}$), R: gas constant (kj $mol^{-1}K^{-1}$)]

Figure 6A:
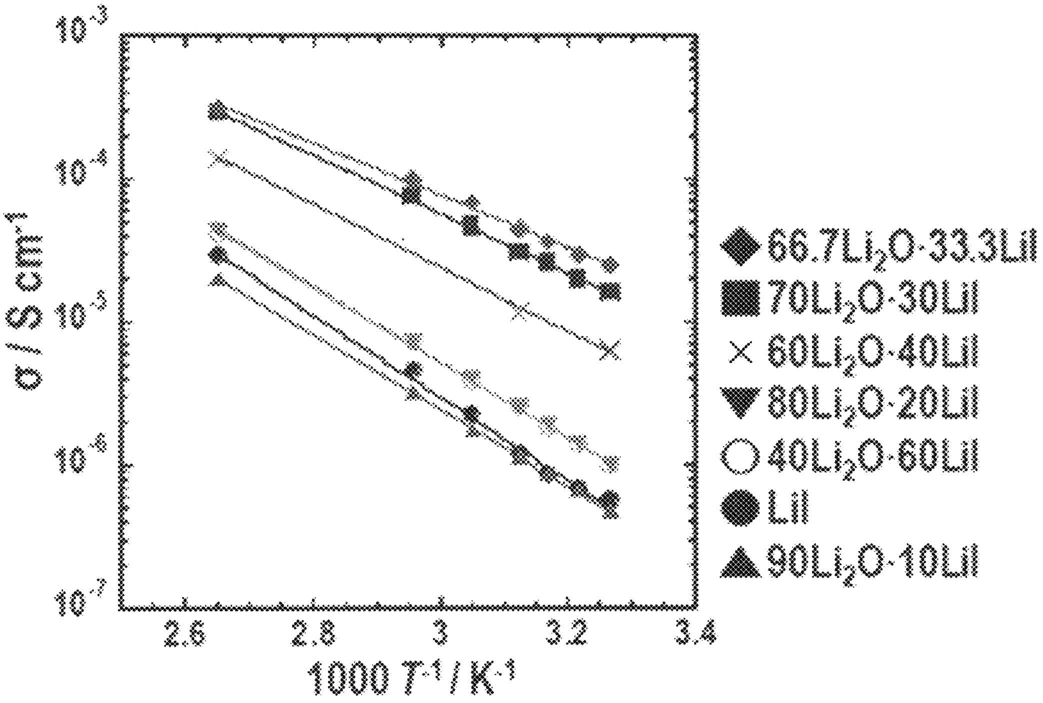
FIG. 6A shows Arrhenius plots of $(100-x)Li_2O\cdot xLiI$.
Figure 6B:
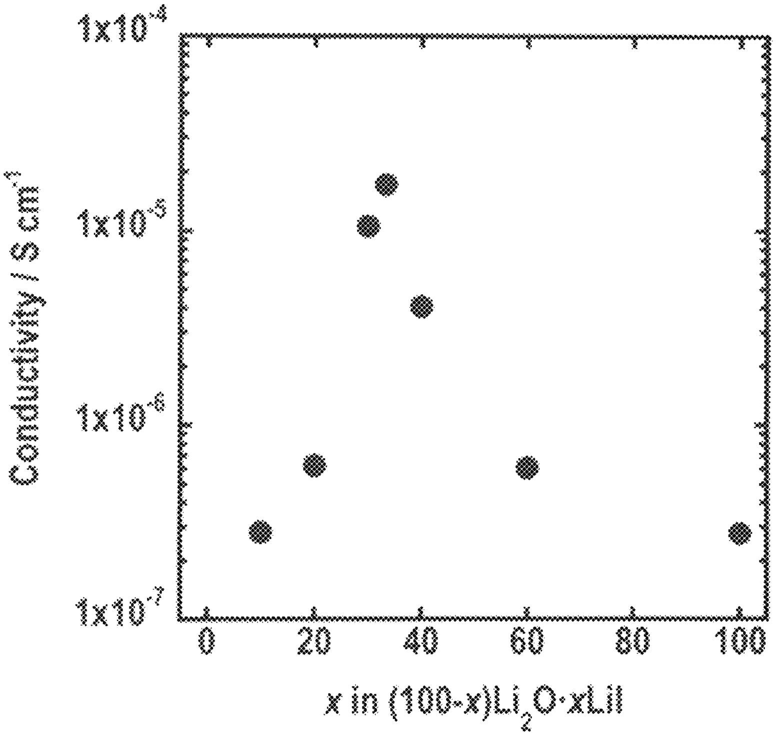
FIG. 6B shows room temperature conductivities calculated from the Arrhenius plots.

FIG. 6A shows an Arrhenius plot based on the measured ion conductivities, and FIG. 6B shows the room temperature conductivities calculated from the Arrhenius plot. Table 4 below shows the ion conductivities and activation energies at room temperature.

TABLE 4

| Sample | $\sigma_{25}$/S $cm^{-1}$ | Ea/kj $mol^{-1}$ |
|---|---|---|
| $Li_2O$ | N/A (Impossible to measure $<10^{-9}$) | N/A |
| $90Li_2O$•10LiI | $2.81 \times 10^{-7}$ | 50.8 |
| $80Li_2O$•20LiI | $6.21 \times 10^{-7}$ | 50.5 |
| $70Li_2O$•30LiI | $1.06 \times 10^{-5}$ | 39.5 |
| $66.7Li_2O$•33.3LiI | $1.72 \times 10^{-5}$ | 35.2 |
| $60Li_2O$•40LiI | $4.07 \times 10^{-6}$ | 41.8 |
| $40Li_2O$•60LiI | $6.08 \times 10^{-7}$ | 50.3 |
| LiI | $2.76 \times 10^{-7}$ | 55.6 |

Table 4 shows that the samples of $80Li_2O$·20LiI, $70Li_2O$·30LiI, $66.7Li_2O$·33.3LiI, $60Li_2O$·40LiI, and $40Li_2O$·60LiI have ion conductivities superior to that of LiI. $90Li_2O$·10LiI also showed a conductivity similar to that of LiI, with a reduced activation energy compared to LiI. In practice, compositions with low LiI content are useful in terms of cost and ease of handling.

Example 3

(Preparation of Ion Conductor 3)

An ion conductor was prepared by combining $Li_2O$ and LiA (A is any one of F, Cl, Br, and I), combining $Li_2O$ and LiOH, or combining LiOH and LiI, and the ion conductivity was measured. The mixing amounts of samples were as shown in Tables 5 to 8 below. The ion conductors were prepared in the same manner as in Example 2 except for the respective weight ratios.

TABLE 5

| Ratio | 1:2 | 1:1 | 2:1 | 1:2 | 1:1 | 2:1 |
|---|---|---|---|---|---|---|
| $Li_2O$•LiA | $33.3Li_2O$•66.7LiF | $50Li_2O$•50LiF | $66.7Li_2O$•33.3LiF | $33.3Li_2O$•66.7LiCl | $50Li_2O$•50LiCl | $66.7Li_2O$•33.3LiCl |
| $Li_2O$/g | 0.1827 | 0.2677 | 0.3487 | 0.1302 | 0.2065 | 0.2923 |
| LiA/g | 0.3173 | 0.2324 | 0.1513 | 0.3699 | 0.2935 | 0.2077 |

TABLE 6

| Ratio | 1:2 | 1:1 | 2:1 | 1:2 | 1:1 | 2:1 |
|---|---|---|---|---|---|---|
| $Li_2O$•LiA | $33.3Li_2O$•66.7LiBr | $50Li_2O$•50LiBr | $66.7Li_2O$•33.3LiBr | $33.3Li_2O$•66.7LiI | $50Li_2O$•50LiI | $66.7Li_2O$•33.3LiI |
| $Li_2O$/g | 0.0734 | 0.1280 | 0.2038 | 0.0502 | 0.0912 | 0.1543 |
| LiA/g | 0.4266 | 0.3720 | 0.2962 | 0.4498 | 0.4088 | 0.3457 |

TABLE 7

| 66.7LiOH•33.3LiI (comparison) | LiOH | LiI |
|---|---|---|
| Molar ratio | 2 | 1 |
| Weight/g | 0.1317 | 0.3683 |

TABLE 8

| $50Li_2O$•50LiOH (comparison) | $Li_2O$ | LiOH |
|---|---|---|
| Molar ratio | 1 | 1 |
| Weight/g | 0.2775 | 0.2225 |

Figure 7:
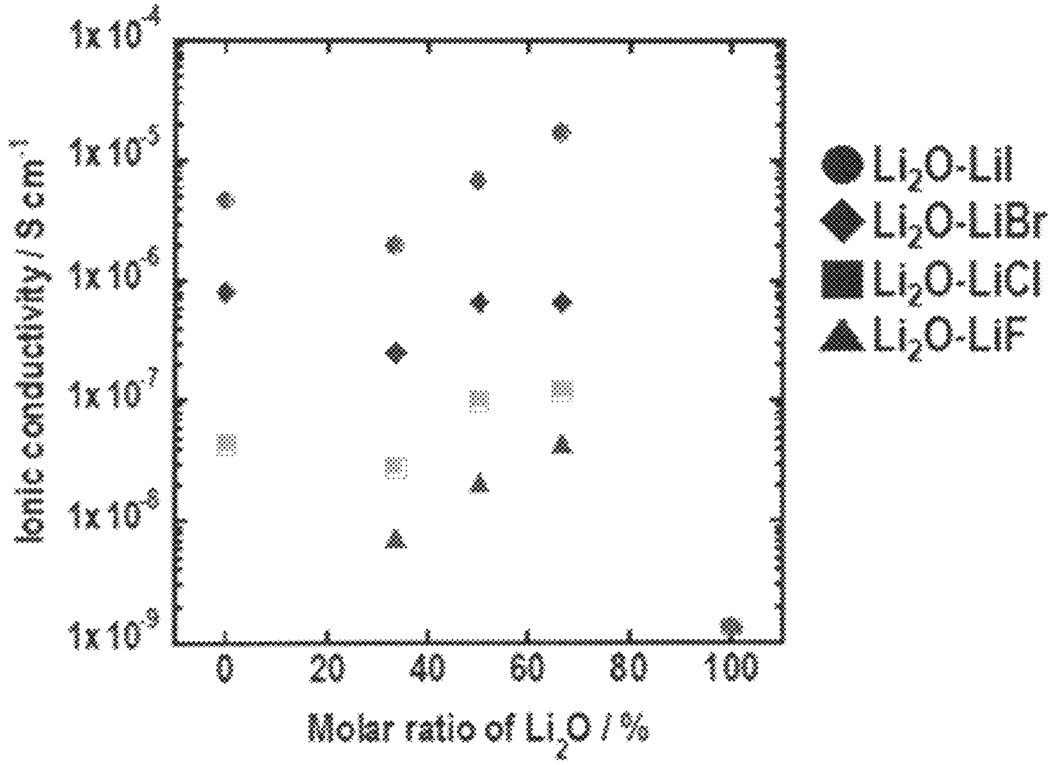
FIG. 7 plots ion conductivities of $Li_2O$:LiX.

FIG. 7 shows the results of the ion conductivity measurement on the samples shown in Tables 5 to 8. It can be seen from FIG. 7 that the ion conductivity is maximum when the molar ratio of $Li_2O$:LiA is 2:1 among the combinations of $Li_2O$ and LiA. It can also be seen that the ion conductivity between halogens improves in the order of F, Cl, Br, and I.

Figure 8A:
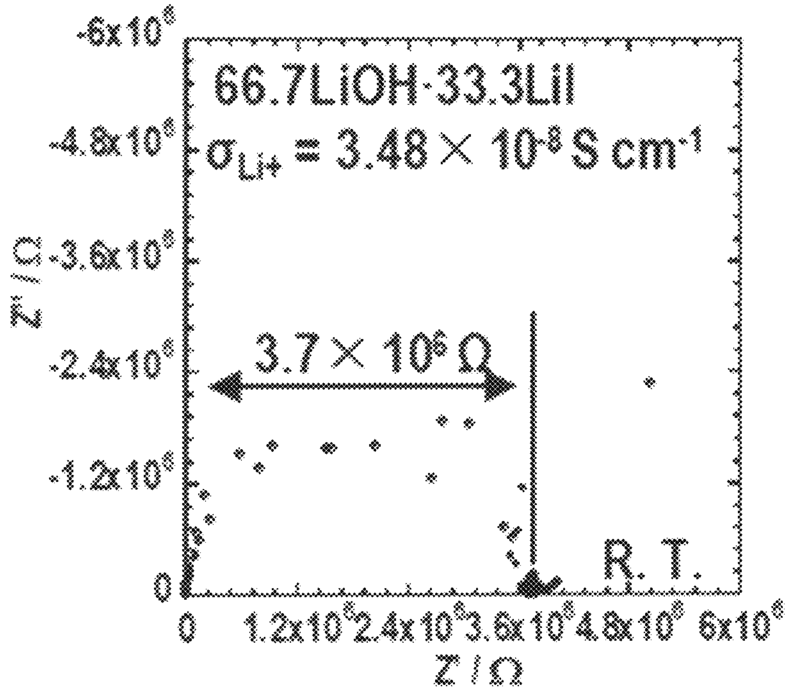
FIG. 8A shows a Nyquist plot of $66.7LiOH\cdot 33.3LiI$.
Figure 8B:
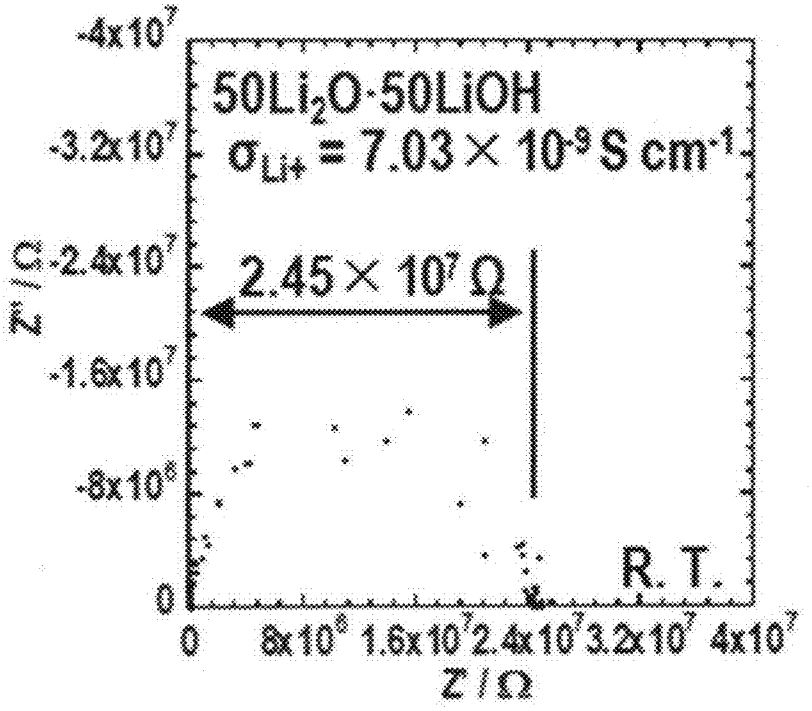
FIG. 8B shows a Nyquist plot of $50Li_2O\cdot 50LiOH$.

The Nyquist plots of the samples of 66.7LiOH·33.3LiI and $50Li_2O$·50LiOH are shown in FIGS. 8A and 8B, respectively. It can be seen from these figures that the $\sigma_{Li+}$ of the sample of 66.7LiOH·33.3LiI is $3.48\times10^{-8}$S $cm^{-1}$, and the $\sigma_{Li+}$ of the sample of $50Li_2O$·50LiOH is $7.03\times10^{-9}$S $cm^{-1}$, indicating that the ion conductivity is low in both cases, and that lithium halide is necessary to improve conductivity.

Figure 9A:
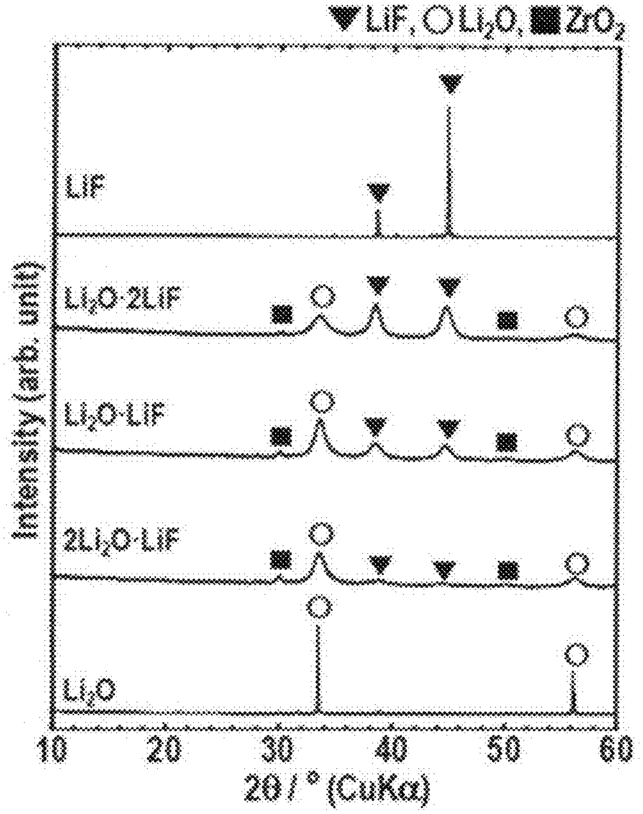
FIG. 9A shows XRD patterns of $Li_2O\cdot LiF$.
Figure 9B:
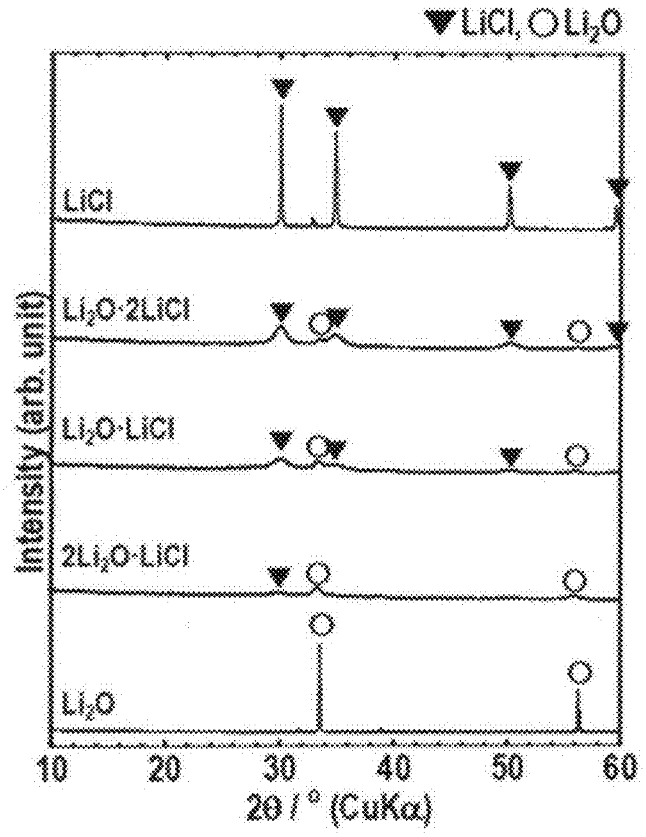
FIG. 9B shows XRD patterns of $Li_2O\cdot LiCl$.
Figure 9C:
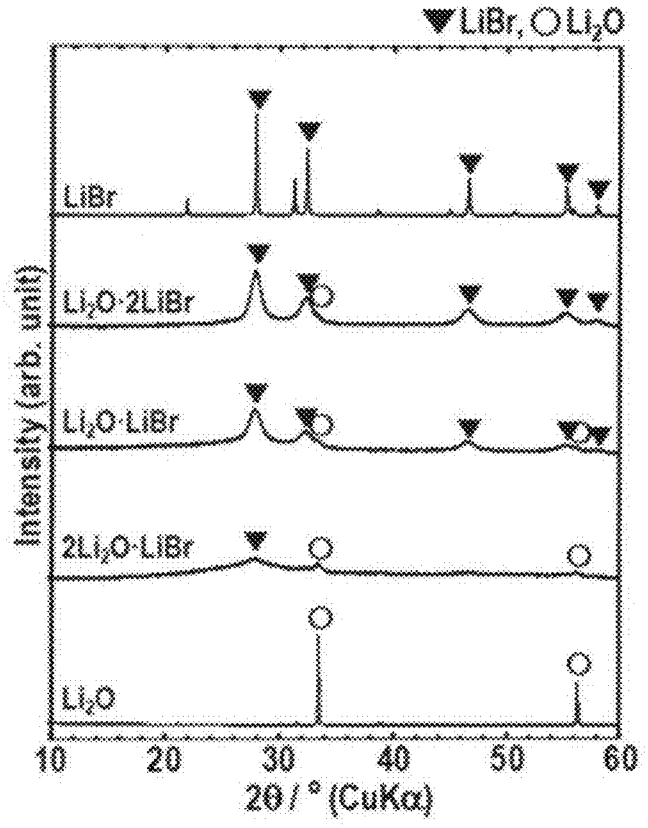
FIG. 9C shows XRD patterns of $Li_2O\cdot LiBr$.
Figure 9D:
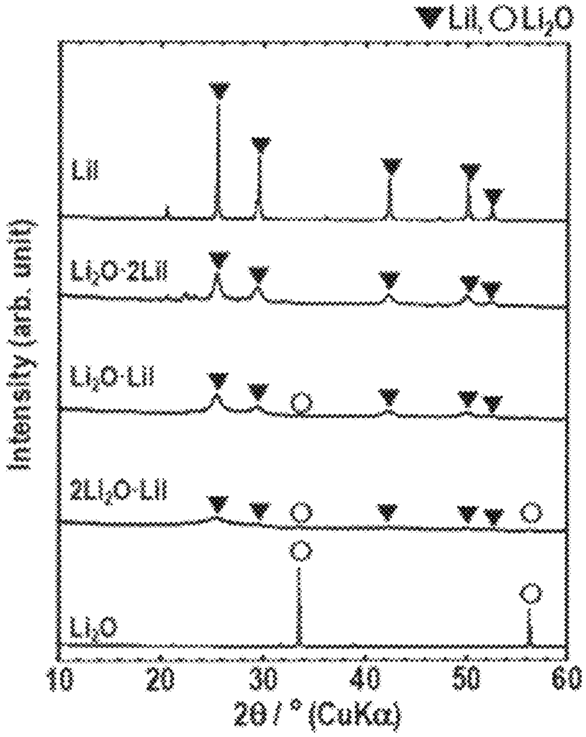
FIG. 9D shows XRD patterns of $Li_2O\cdot LiI$.
Figure 9E:
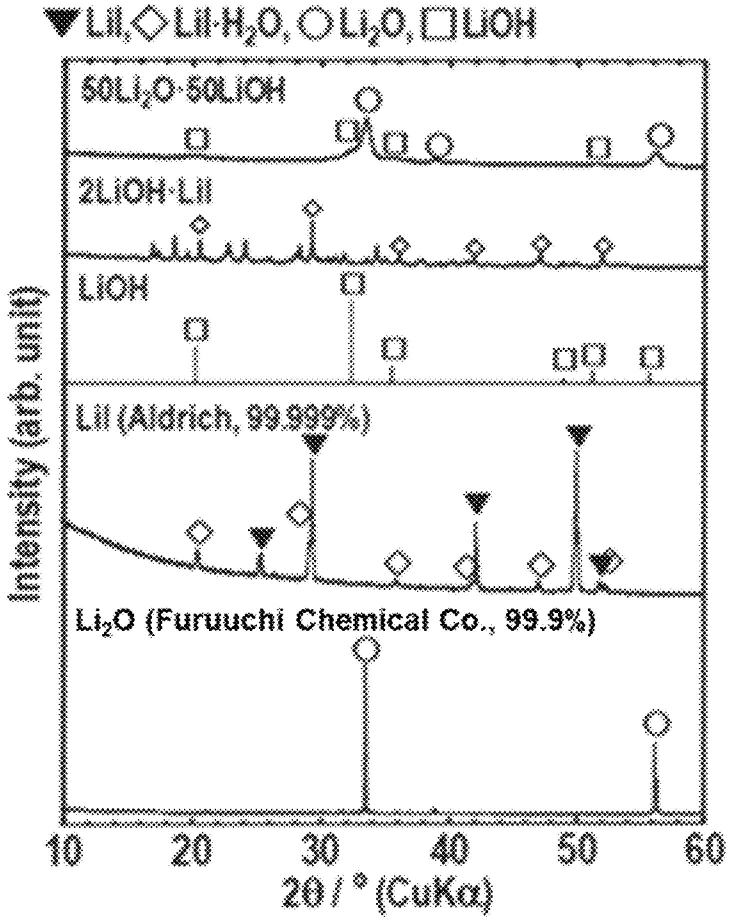
FIG. 9E shows XRD patterns of $66.7LiOH\cdot 33.3LiI$ and $50Li_2O\cdot 50LiOH$.

X-ray diffraction (XRD) measurement was performed on the samples shown in Tables 5 to 8. The results are shown in FIGS. 9A to 9E. FIG. 9A also shows measurement results of LiF and $Li_2O$ for comparison, FIG. 9B also shows measurement results of LiCl and $Li_2O$ for comparison, FIG. 9C also shows measurement results of LiBr and $Li_2O$ for comparison, FIG. 9D also shows measurement results of LiI and $Li_2O$ for comparison, and FIG. 9E also shows measurement results of LiOH, $Li_2O$, and LiI for comparison. It can be seen from FIGS. 9A to 9E that each sample of the examples shown in Tables 5 to 8 has a broad peak and is in an amorphous state.

($^7$Li MAS-NMR Spectrum)

The above sample powder of $66.7Li_2O$·33.3LiI was subjected to solid-state NMR, and the local structure of the prepared sample around lithium was examined. The solid-state NMR was performed as follows.

The powder sample was packed in a $ZrO_2$ tube in a glove box under an argon atmosphere. The sample tube in which the powder sample has been packed was subjected to JNM-ECX 400(400 MHz, 9.4 T) for measurement. Lithium chloride (LiCl, −1.19 ppm) was used as a reference material. The resonance frequency of lithium was 155.5 MHz. The rotational speed of the sample tube of the probe was 12 to 15 kHz, the waiting time of the repetitive pulse was 5 s, and the number of integrations was 50. The measurement was performed for $Li_2O$ and LiI in the same manner.

Figure 10:
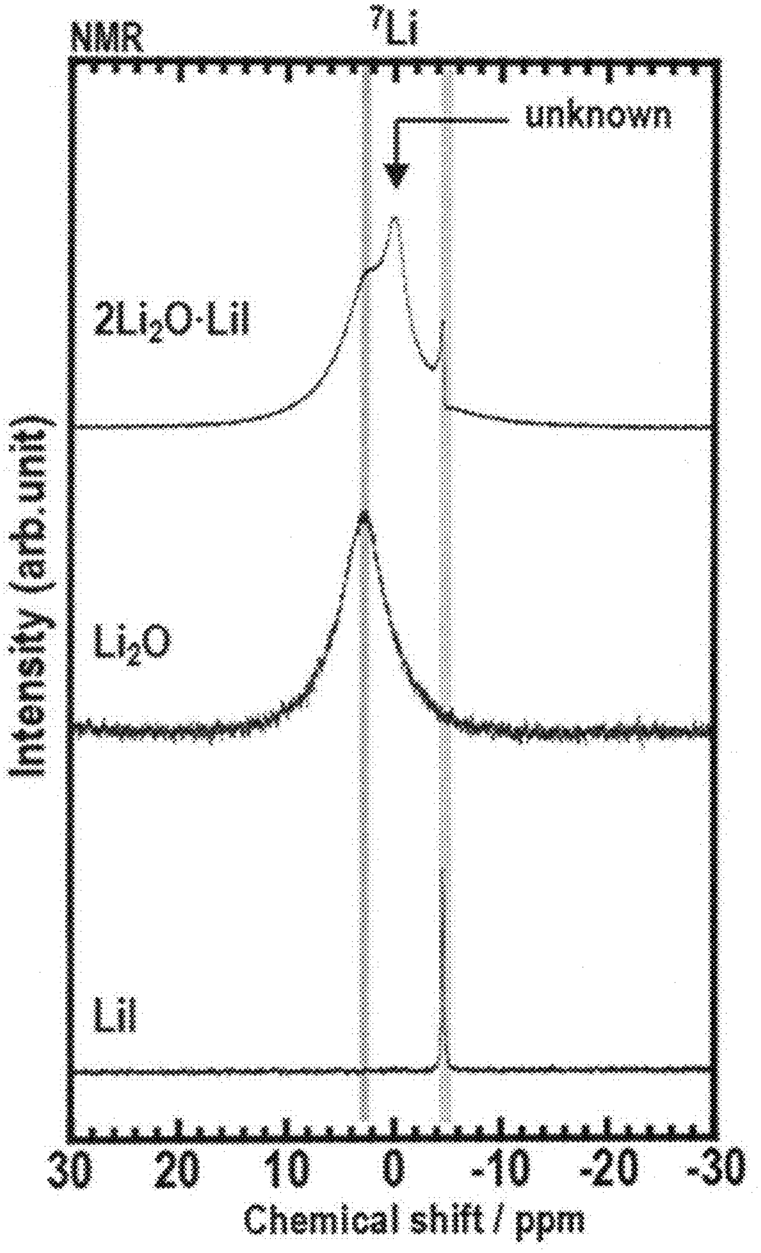
FIG. 10 shows a $^7Li$ MAS-NMR spectrum.

The measured $^7$Li MAS-NMR spectrum is shown in FIG. 10. FIG. 10 shows that, $66.7Li_2O$·33.3LiI has three kinds of peaks, which includes a peak that cannot be attributed to the raw materials. This is considered to be because something is formed at the interface between $Li_2O$ and LiI. Since no unattributed material is observed in the XRD pattern of $Li_2O$·LiI, it is considered that this unattributed material is noncrystalline, which improves the ion conductivity of $66.7Li_2O$·33.3LiI.

(Raman Spectrum Measurement)

Raman spectrum measurement was performed using the sample powders of $90Li_2O$·10LiI, $70Li_2O$·30LiI, $66.7Li_2O$·33.3LiI, $50Li_2O$·50LiI, $40Li_2O$·60LiI, $30Li_2O$·70LiI, and $20Li_2O$·80LiI described above. For the measurement, a laser Raman spectrometer LabRAM HR-800 was used, each powder sample was fixed in an Al pan in argon gas, and measured using an airtight sample stage (LIBCell-P11D5, nano photon). The measurement was performed using a He—Cd laser (325 nm) as an oscillation line. The measurement was performed for $Li_2O$ and LiI in the same manner.

Figure 11A:
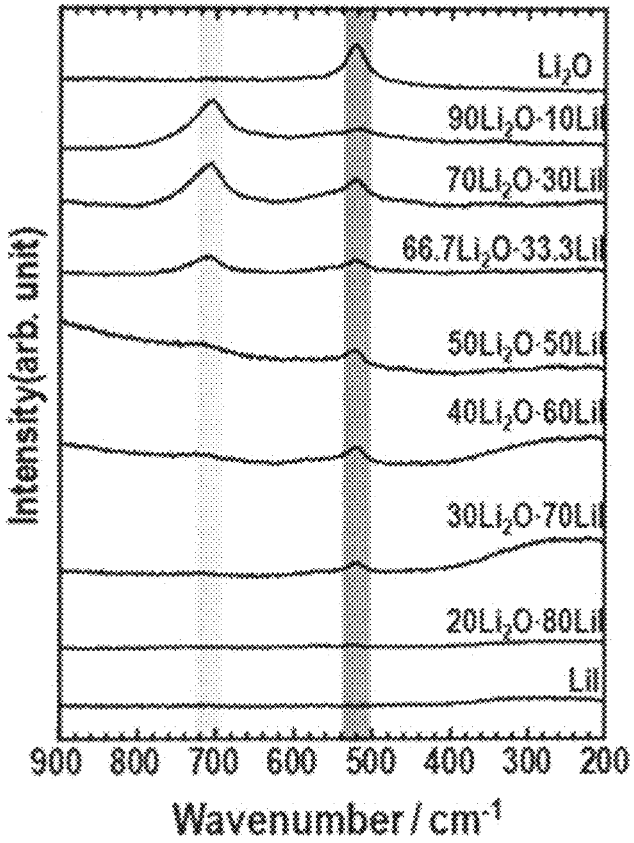
FIG. 11A shows a Raman spectrum of $Li_2O\cdot LiI$ from 200 to 900 $cm^{-1}$.
Figure 11B:
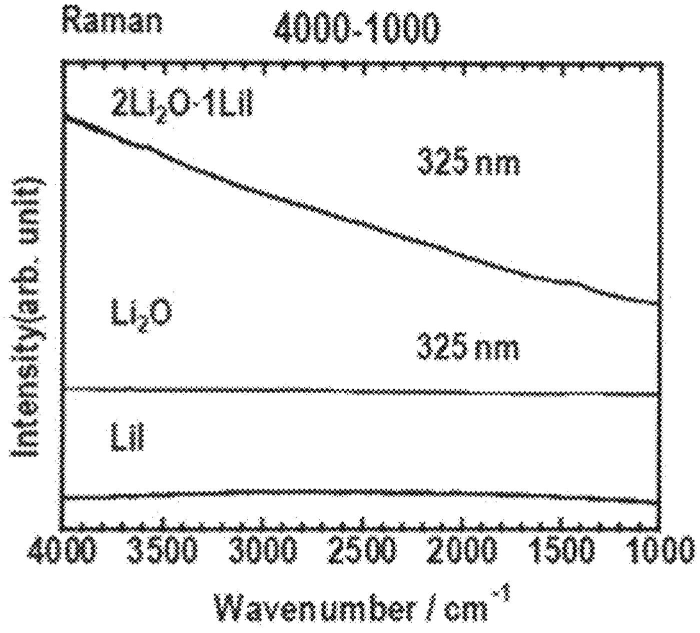
FIG. 11B shows a Raman spectrum of $66.7Li_2O\cdot 33.3LiI$ from 1000 to 4000 $cm^{-1}$.

The results are shown in FIGS. 11A and 11B. From FIG. 11A, a Raman band similar to that of $Li_2O$ was identified in $90Li_2O$·10LiI, $70Li_2O$·30LiI, $66.7Li_2O$·33.3LiI, $50Li_2O$·50LiI, $40Li_2O$·60LiI, and $30Li_2O$·70LiI. It can also be seen that a new Raman band appears around 700 $cm^{-1}$ in $90Li_2O$·10LiI, $70Li_2O$·30LiI, $66.7Li_2O$·33.3LiI, and $50Li_2O$·50LiI. From FIG. 11B, no peak attributable to the hydroxyl group (OH group) was clearly identified.

SEM Observation and EDS Measurement

The above sample powder of $66.7Li_2O$·33.3LiI was subjected to SEM observation and EDS analysis. FE-SEM SU8220 was used for SEM with a working distance of 5 mm and an applied voltage of 1 to 10 kV. After SEM observation, analysis was performed using an energy dispersive X-ray analysis (EDX) apparatus. At this time, the working distance of the SEM was 15 mm, and the applied voltage was 10 kV.

Figure 12:
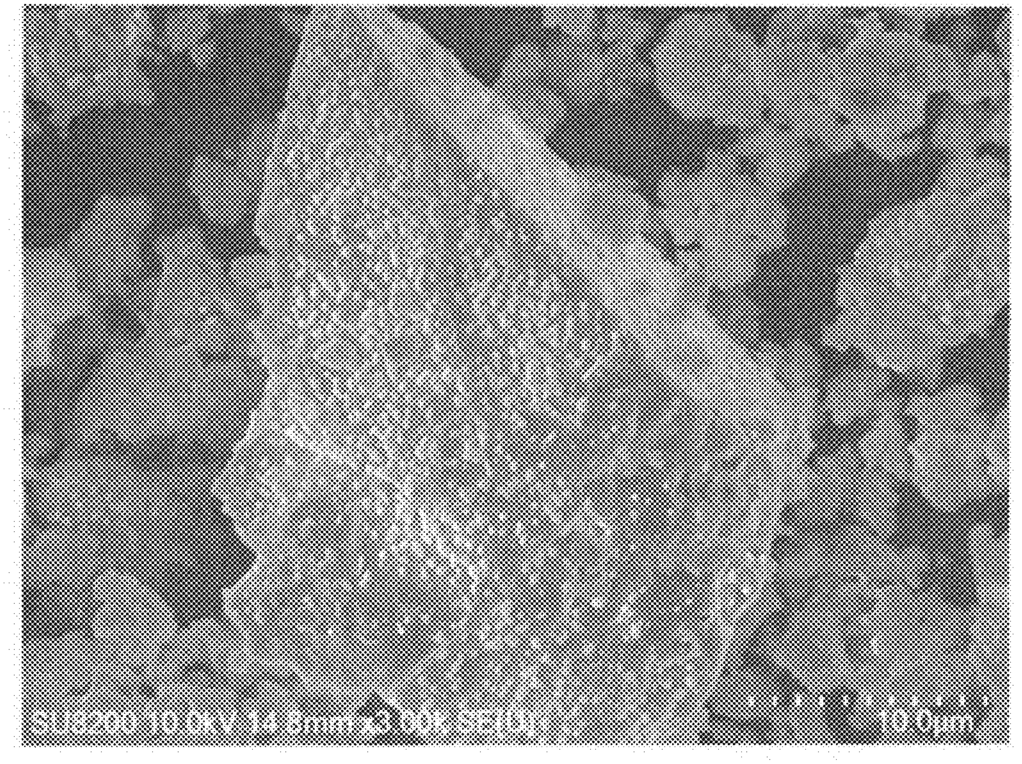
FIG. 12 is an example of a 3000×SEM image of $66.7Li_2O\cdot 33.3LiI$.
Figure 13A:
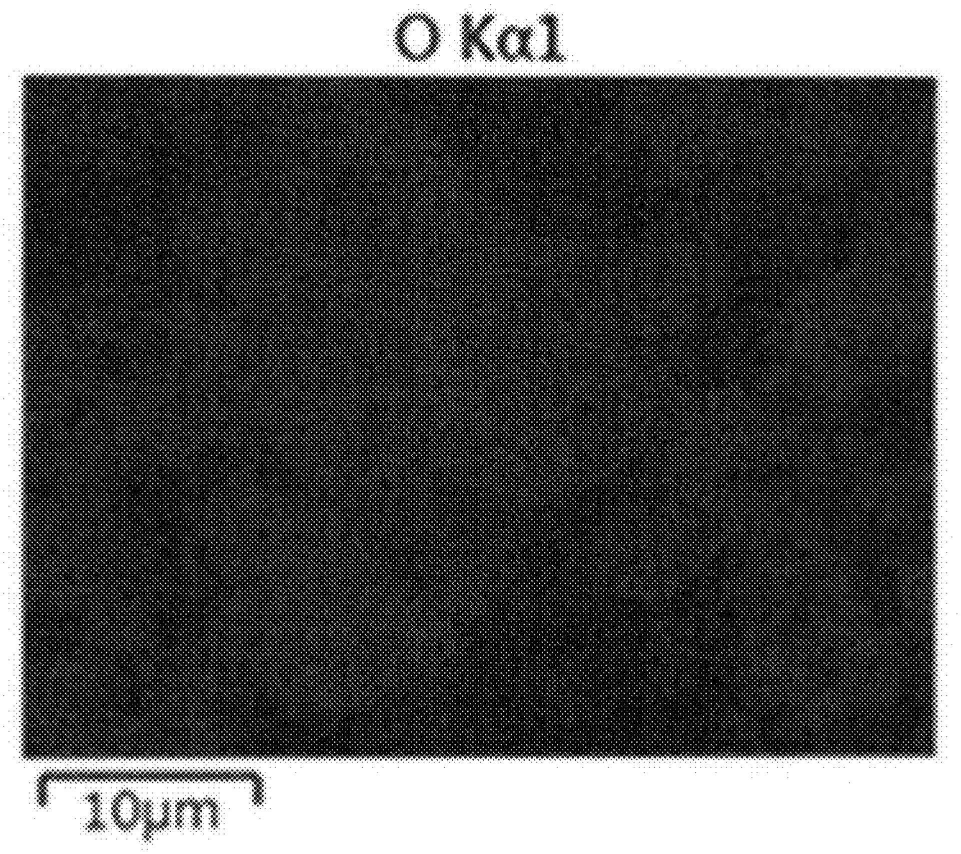
FIG. 13A is an example of a 3000×SEM-EDS mapping image of $66.7Li_2O\cdot 33.3LiI$ for O.
Figure 13B:
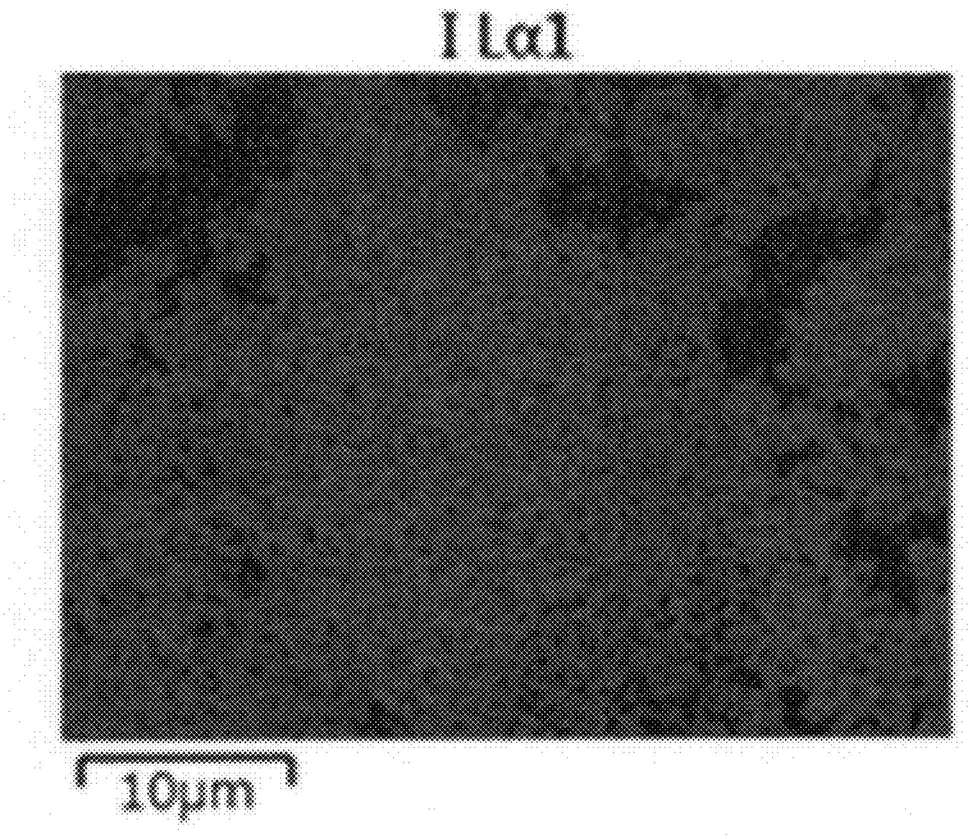
FIG. 13B is an example of a 3000×SEM-EDS mapping image of $66.7Li_2O\cdot 33.3LiI$ for I.

The SEM measurement results are shown in FIG. 12, and the EDS analysis results are shown in FIGS. 13A and 13B. It can be seen from FIGS. 13A and 13B that the 0 and I elements of $66.7Li_2O_{33.3}$LiI are dispersed in the ion conductor.

Example 4

(Preparation of Ion Conductor 4)

An ion conductor was prepared by combining $Li_2O$ and LiI with a network-forming oxide, a network-modifying oxide, or an intermediate oxide Z (hereinafter referred to as oxide Z), and its XRD and ion conductivity were measured. As the oxide Z, $Al_2O_3$, $B_2O_3$, $GeO_2$, $P_2O_5$, $SiO_2$, and $V_2O_3$ were used. $Li_2O$ and LiI were mixed at a ratio of 2:1. The types and mixing ratios of the oxide Z were as shown in Tables 9 to 11 below. The ion conductors were prepared in the same manner as in Example 2 except for the respective weight ratios. Tables 9 to 11 also show the measured ion conductivities of the samples.

TABLE 9

| Z | $Al_2O_3$ | $B_2O_3$ | $GeO_2$ | $P_2O_5$ | $SiO_2$ | $V_2O_3$ |
|---|---|---|---|---|---|---|
| 66.7 $Li_2O$•33.3LiI:Z ratio | 97:3 | 97:3 | 97:3 | 97:3 | 97:3 | 97:3 |
| Ion conductivity | $1.62\times10^{-5}$ | $7.76\times10^{-6}$ | $4.92\times10^{-7}$ | $2.80\times10^{-6}$ | $1.19\times10^{-5}$ | $7.83\times10^{-7}$ |

TABLE 10

| Z | $Al_2O_3$ | $B_2O_3$ | $GeO_2$ | $P_2O_5$ | $SiO_2$ | $V_2O_3$ |
|---|---|---|---|---|---|---|
| 66.7 $Li_2O$•33.3LiI:Z ratio | 90:10 | 90:10 | 90:10 | 90:10 | 90:10 | 90:10 |
| Ion conductivity | $8.03 \times 10^{-6}$ | $2.85 \times 10^{-7}$ | $6.64 \times 10^{-6}$ | $6.55 \times 10^{-6}$ | $2.39 \times 10^{-6}$ | $1.51 \times 10^{-5}$ |

TABLE 11

| Z | $Al_2O_3$ | $B_2O_3$ | $GeO_2$ | $P_2O_5$ | $SiO_2$ | $V_2O_3$ |
|---|---|---|---|---|---|---|
| 66.7 $Li_2O$•33.3LiI:Z ratio | 80:20 | 80:20 | 80:20 | 80:20 | 80:20 | 80:20 |
| Ion conductivity | $1.93 \times 10^{-6}$ | $1.19 \times 10^{-7}$ | $1.51 \times 10^{-6}$ | $3.42 \times 10^{-6}$ | $1.15 \times 10^{-6}$ | $1.53 \times 10^{-5}$ |

Figure 14A:
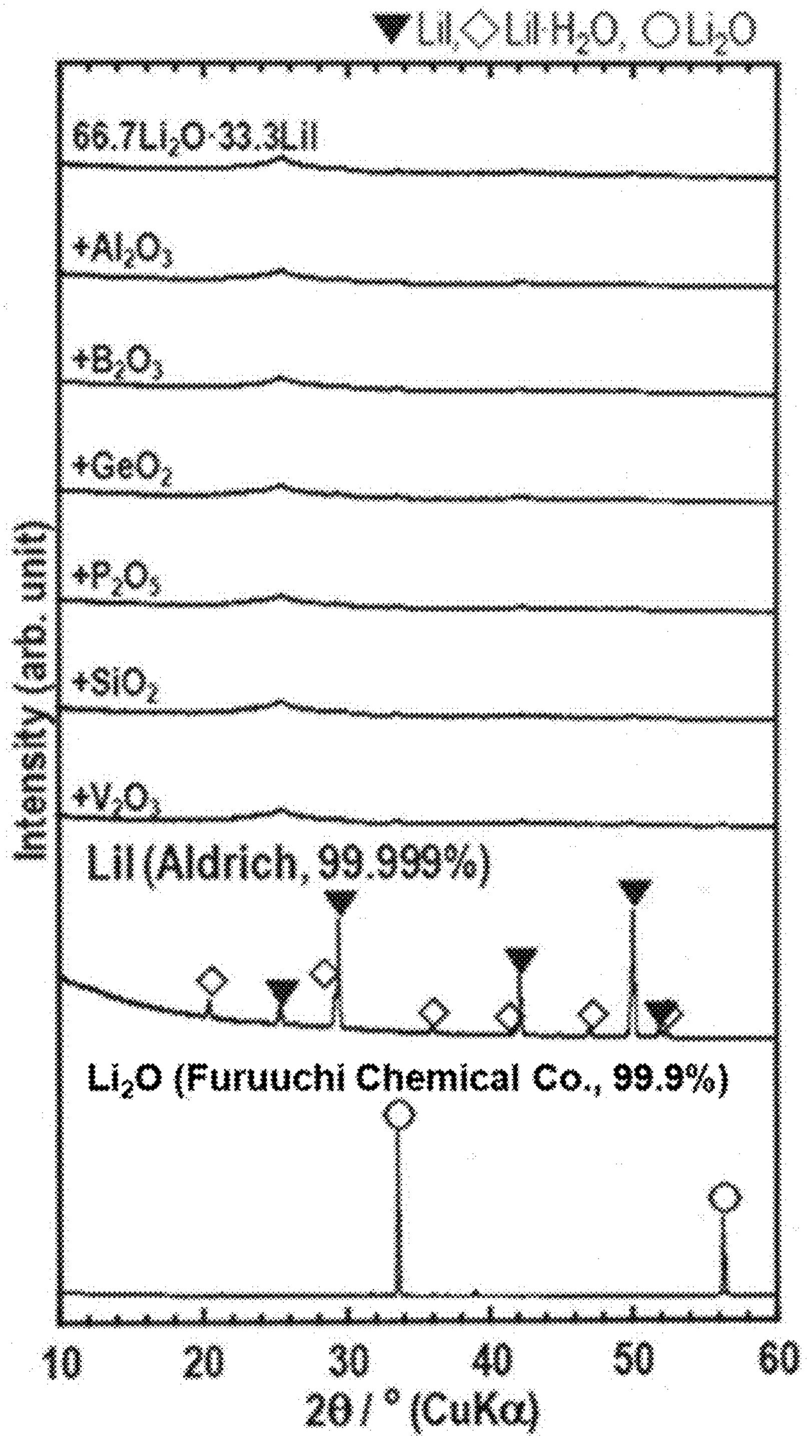
FIG. 14A shows XRD patterns of $66.7Li_2O\cdot 33.3$ LiI—Z.
Figure 14B:
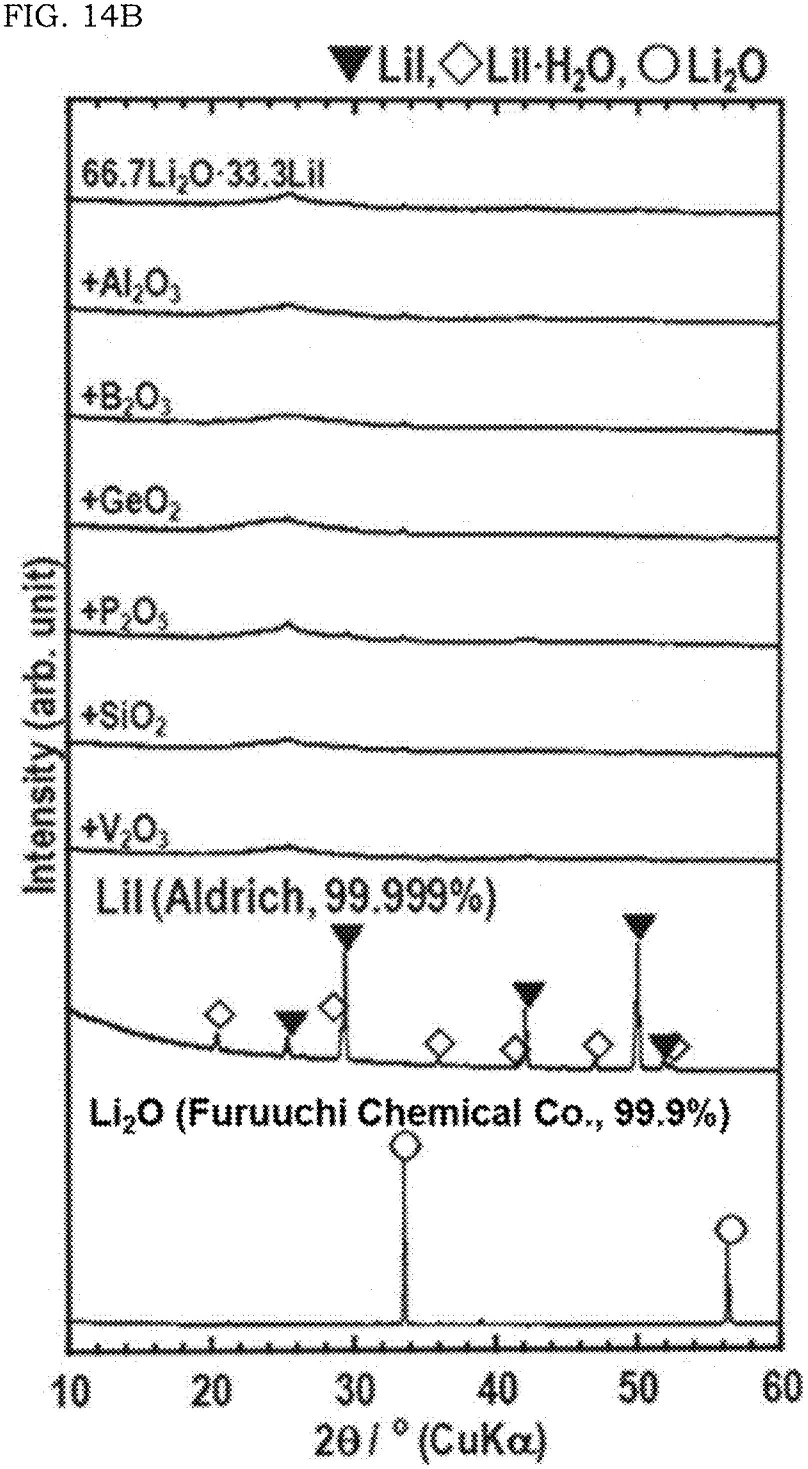
FIG. 14B shows XRD patterns of $66.7Li_2O\cdot 33.3$ LiI—Z.
Figure 14C:
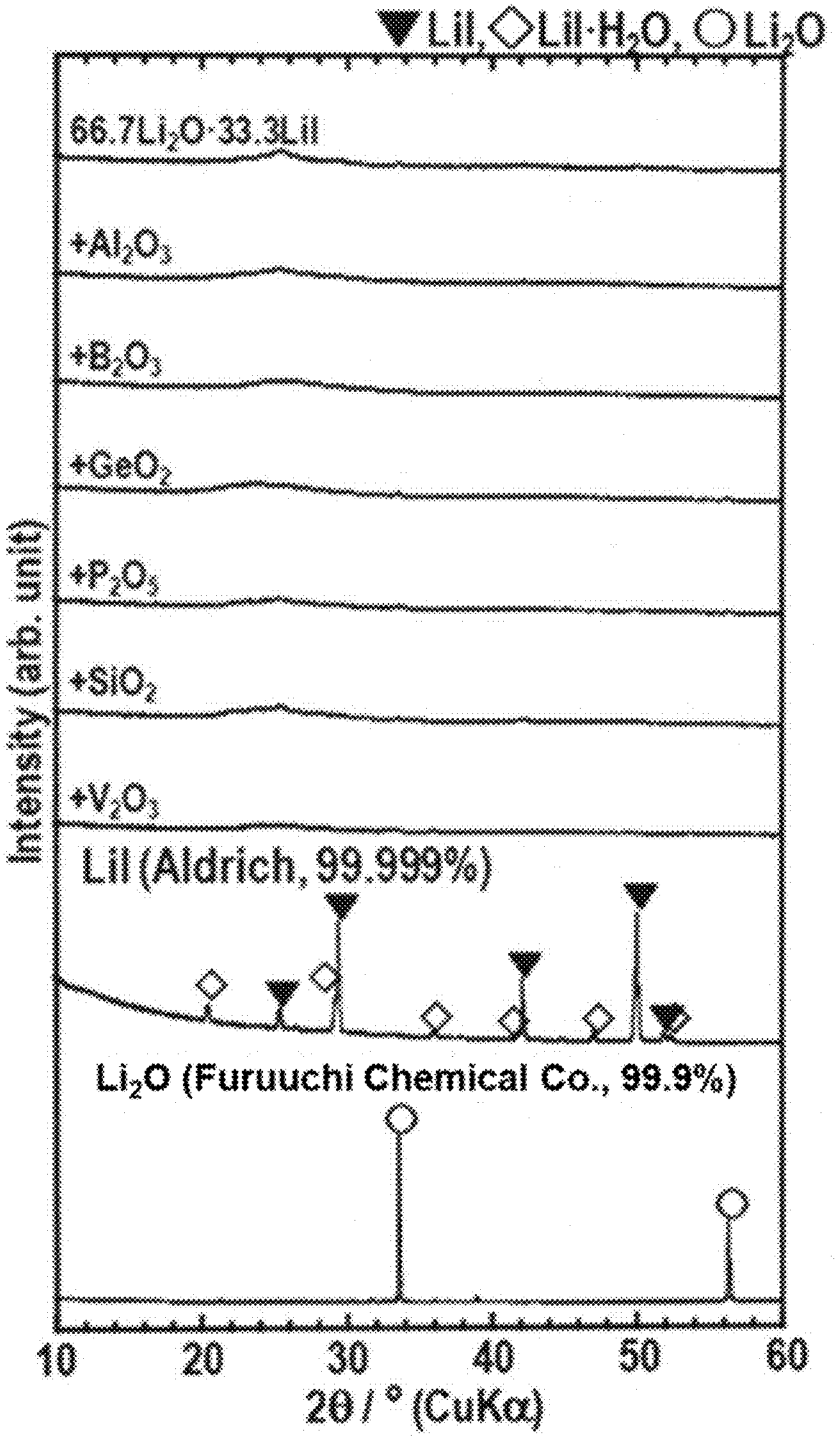
FIG. 14C shows XRD patterns of $66.7Li_2O\cdot 33.3$ LiI—Z.
Figure 15:
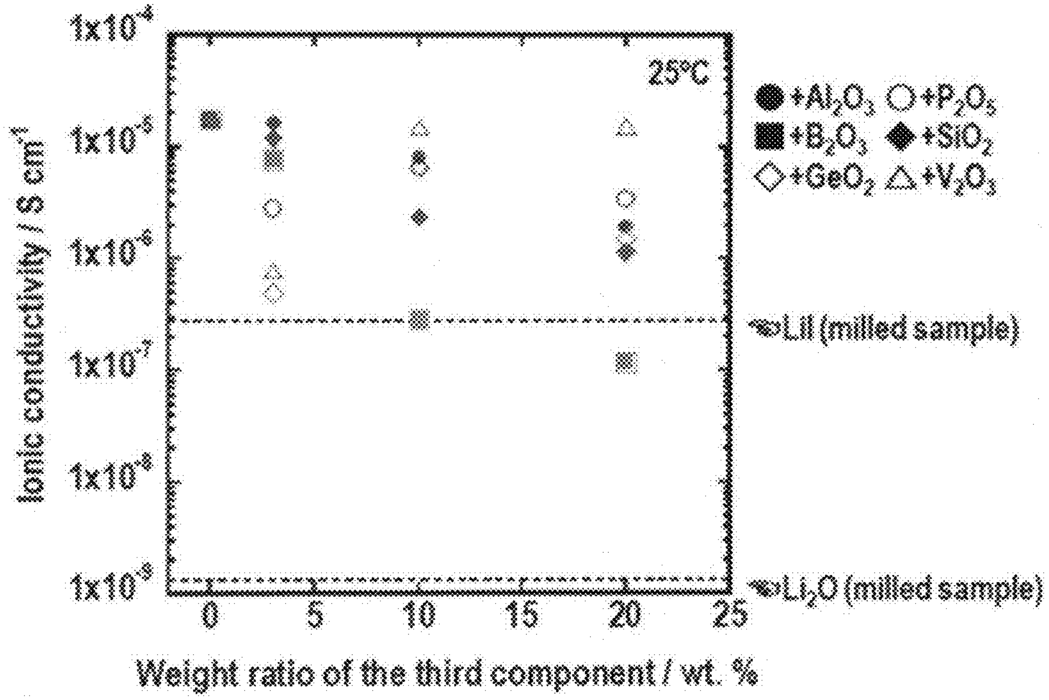
FIG. 15 compares the ion conductivities of $66.7Li_2O\cdot 33.3$ LiI—Z and LiI.

The XRD patterns of the prepared samples are shown in FIGS. 14A to 14C, respectively. FIG. 14A shows the result of adding oxide Z to the ion conductor so that the content thereof becomes 3% by mass of the total mass of the ion conductor, FIG. 14B shows the result of adding oxide Z to the ion conductor so that the content thereof becomes 10% by mass of the total mass of the ion conductor, and FIG. 14C shows the result of adding oxide Z to the ion conductor so that the content thereof becomes 20% by mass of the total mass of the ion conductor. FIG. 15 shows a comparison of each of the ion conductivities with the ion conductivity of LiI. It can be seen from FIGS. 14A to 14C that each sample to which oxide Z has been added is in an amorphous state showing a broad peak. When the ion conductivity of $Li_2O$ was measured under the same conditions, the ion conductivity was $1.34\times10^{-9}$ S $cm^{-1}$, and it was found that all of the prepared samples exceeded the ion conductivity of $Li_2O$. Further, the fact that the ion conductivity was $2.76\times10^{-7}$ S $cm^{-1}$ when the ion conductivity of LiI was measured under the same conditions and FIG. 15 show that the samples have ion conductivities superior to that of LiI except for 66.7$Li_2O$·33.3LiI—Z containing 20% $B_2O_3$.

Example 5

(Consideration of Milling Conditions)

The mechanochemical conditions for preparation of ion conductors were considered.

Figure 16A:
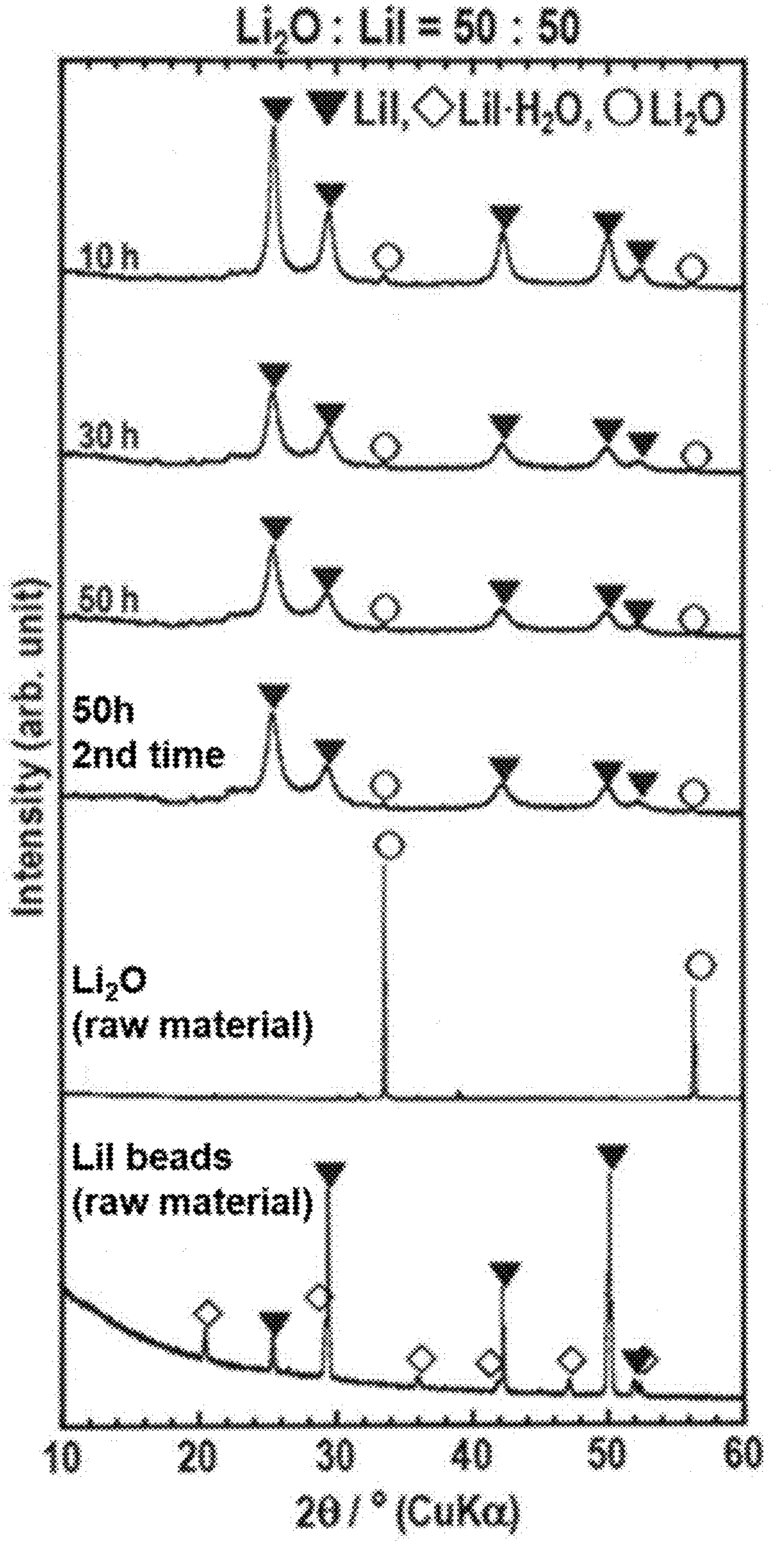
FIG. 16A shows XRD patterns of $50Li_2O{\cdot}50LiI$ prepared by changing the milling time.
Figure 16B:
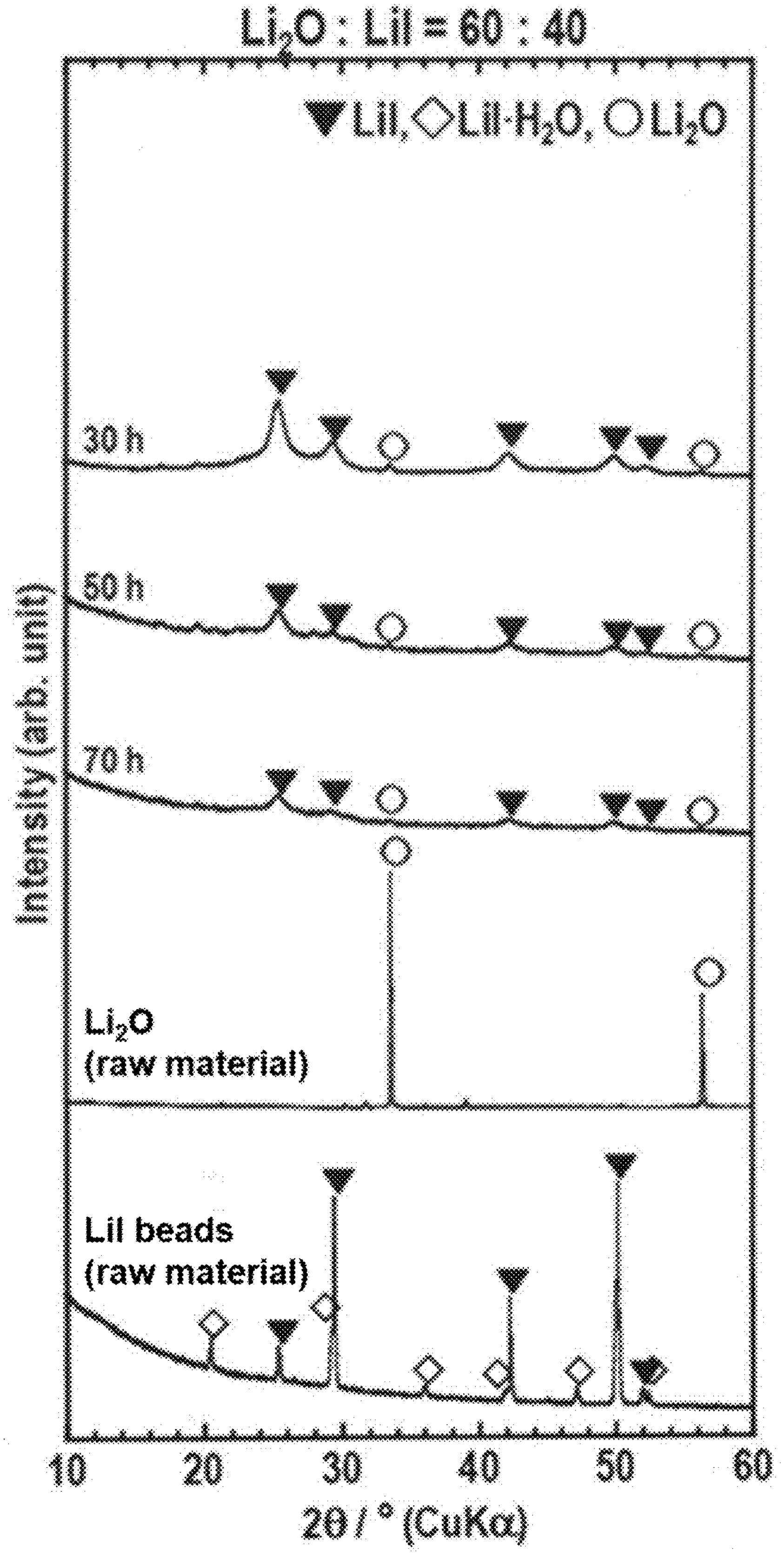
FIG. 16B shows XRD patterns of $60Li_2O{\cdot}40LiI$ prepared by changing the milling time.
Figure 16C:
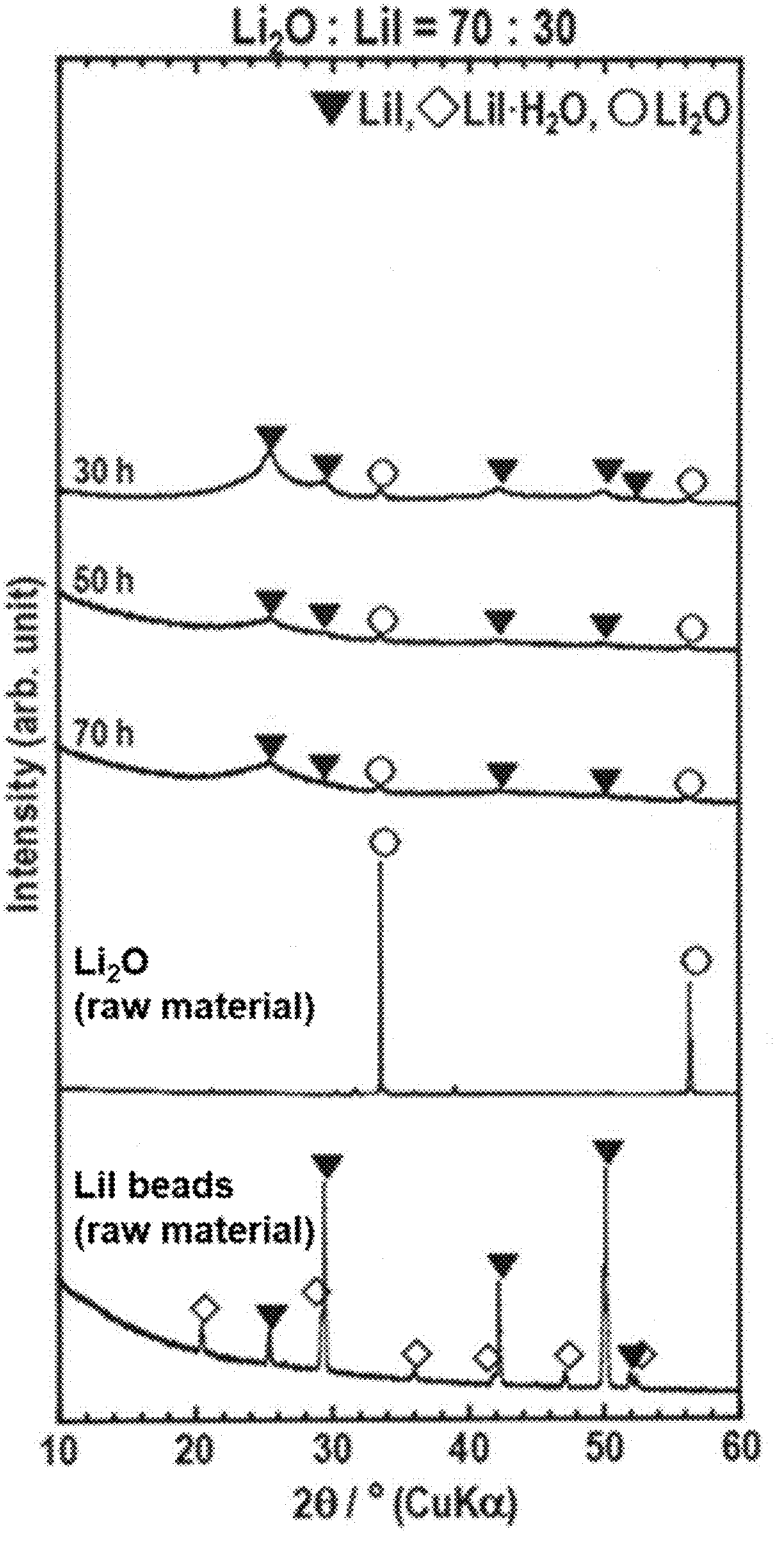
FIG. 16C shows XRD patterns of $70Li_2O{\cdot}30LiI$ prepared by changing the milling time.

Milling Time $Li_2O$ and LiI were mixed in three patterns of ratio of 50:50, 60:40, and 70:30, and each sample was subjected to mechanochemical treatment by changing the milling time to 10 hours (10 hours is only for 50:50), 30 hours, 50 hours, and 70 hours, so as to investigate the effect on the ion conductor. The conditions other than the milling time were the same as those in Example 2. FIGS. 16A to 16C show the results of the XRD measurement performed on the prepared samples. FIG. 16A shows the result of 50:50, FIG. 16B shows the result of 60:40, and FIG. 16C shows the result of 70:30. In each figure, the measurement results of LiI and $Li_2O$ are shown for comparison. It can be seen from FIGS. 16A to 16C that the peak intensity decreases and the crystallinity of the ion conductor decreases as the mechanochemical treatment time increases until the treatment time reaches 50 hours.

Figure 17:
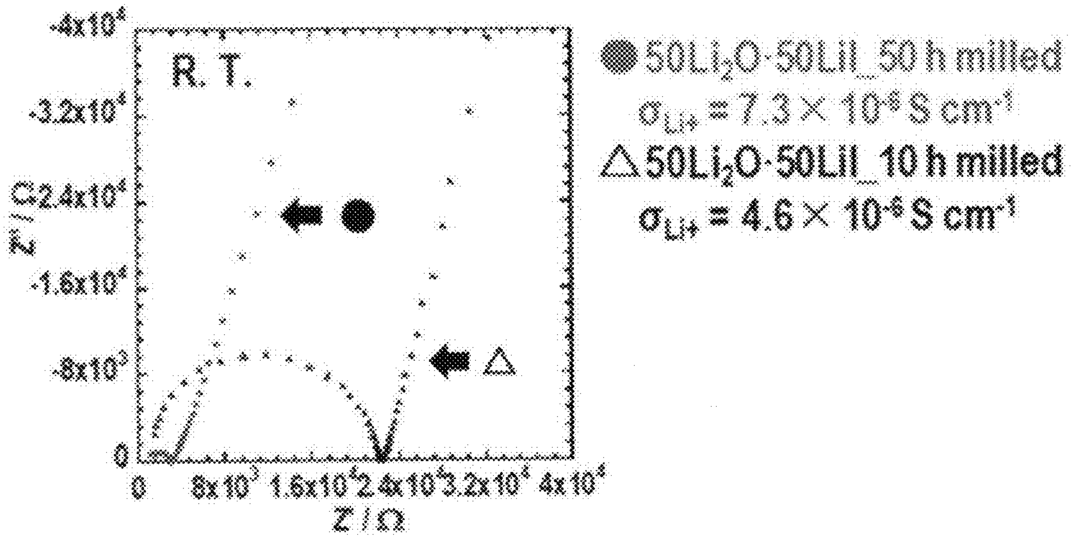
FIG. 17 shows a Nyquist plot of $50Li_2O{\cdot}50LiI$ prepared by changing the milling time.

Further, FIG. 17 shows a Nyquist plot of the sample obtained by mixing $Li_2O$ and LiI at a ratio of 50:50. It can be seen from FIG. 17 that the ion conductivity was higher when the milling time is 50 hours than that when it is 10 hours, and the ion conductivity increased as the crystallinity of the ion conductor decreased.

Ball Conditions

Mechanochemical treatment was performed by changing the ball conditions as shown in Table 12 below. $Li_2O$ and LiI used in the test were mixed at a ratio of 50:50.

TABLE 12

| | Rota-tional Speed | Milling Time | Charged weight | $ZrO_2$ ball size | $ZrO_2$ ball weight: |
|---|---|---|---|---|---|
| Test 1 | 510 rpm | 30 h | 0.5 g | Diameter 10 mm | 32.5 g (10 pieces) |
| Test 2 | 510 rpm | 30 h | 0.5 g | Diameter 5 mm | 32.5 g |
| Test 3 | 510 rpm | 30 h | 0.5 g | Diameter 4 mm | 90.0 g |
| Test 4 | 510 rpm | 30 h | 0.3 g | Diameter 4 mm | 28.8 g |

Figure 18:
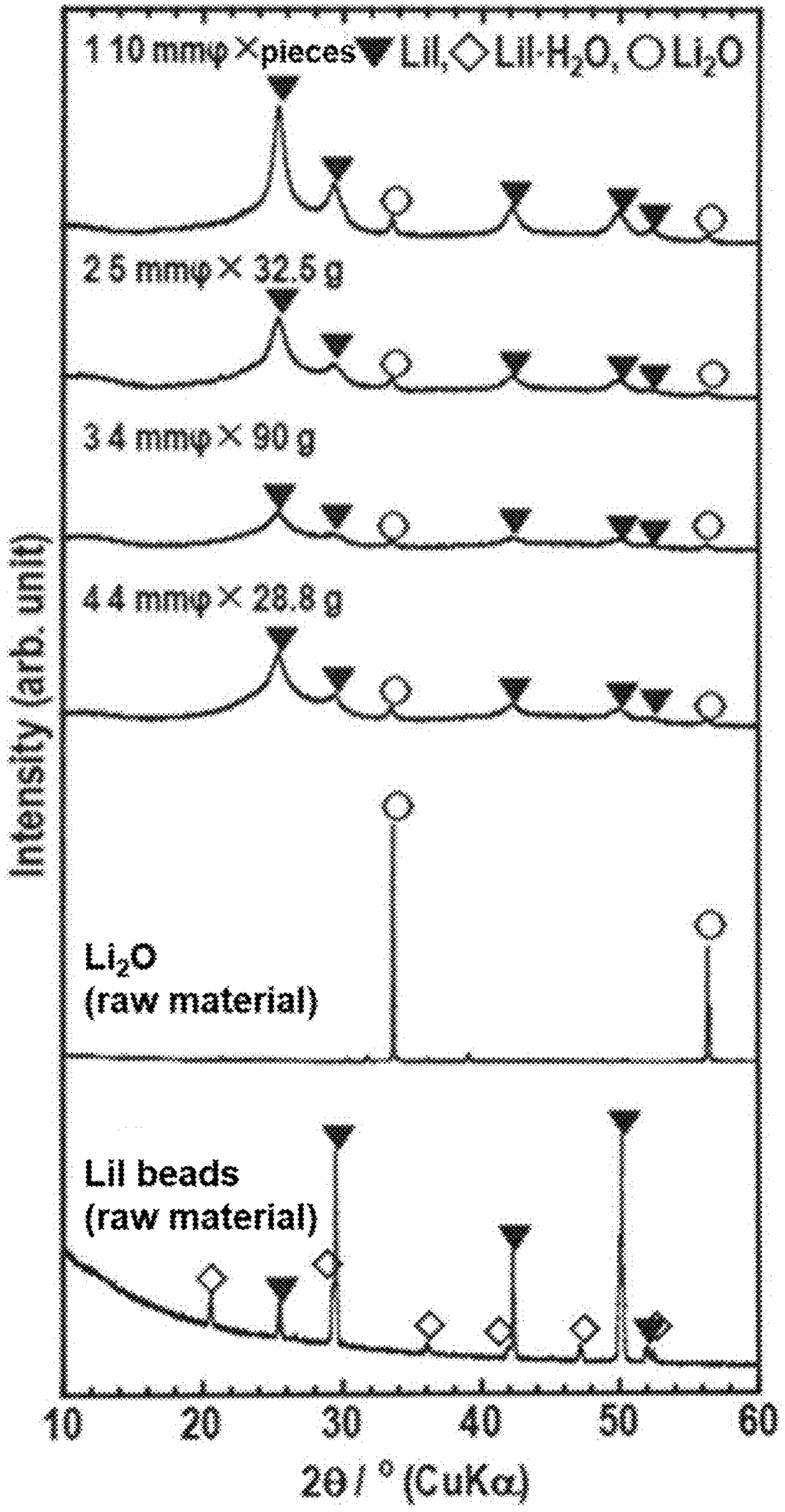
FIG. 18 shows XRD patterns of $50Li_2O{\cdot}50LiI$ prepared by changing the ball conditions.

FIG. 18 shows the results of XRD tests performed on tested samples. It can be seen from FIG. 18 that test 1 showed the highest crystallinity, and test 3 showed the highest amorphousness.

Rotation Conditions

Mechanochemical treatment was performed by changing the rotation conditions as shown in Table 13 below. $Li_2O$ and LiI used in the tests were mixed at a ratio of 66.7:33.3.

TABLE 13

| | Rota-tional Speed | Milling Time | Charged weight | $ZrO_2$ ball size | $ZrO_2$ ball weight |
|---|---|---|---|---|---|
| Test A | 370 rpm | 20 h, 40 h, 80 h | 0.5 g | Diameter 5 mm | 32.5 g |
| Test B | 370 rpm | 20 h, 40 h, 80 h | 0.5 g | Diameter 5 mm | 50.0 g |
| Test C | 510 rpm | 30 h, 50 h, 70 h | 0.5 g | Diameter 5 mm | 32.5 g |

Figure 19A:
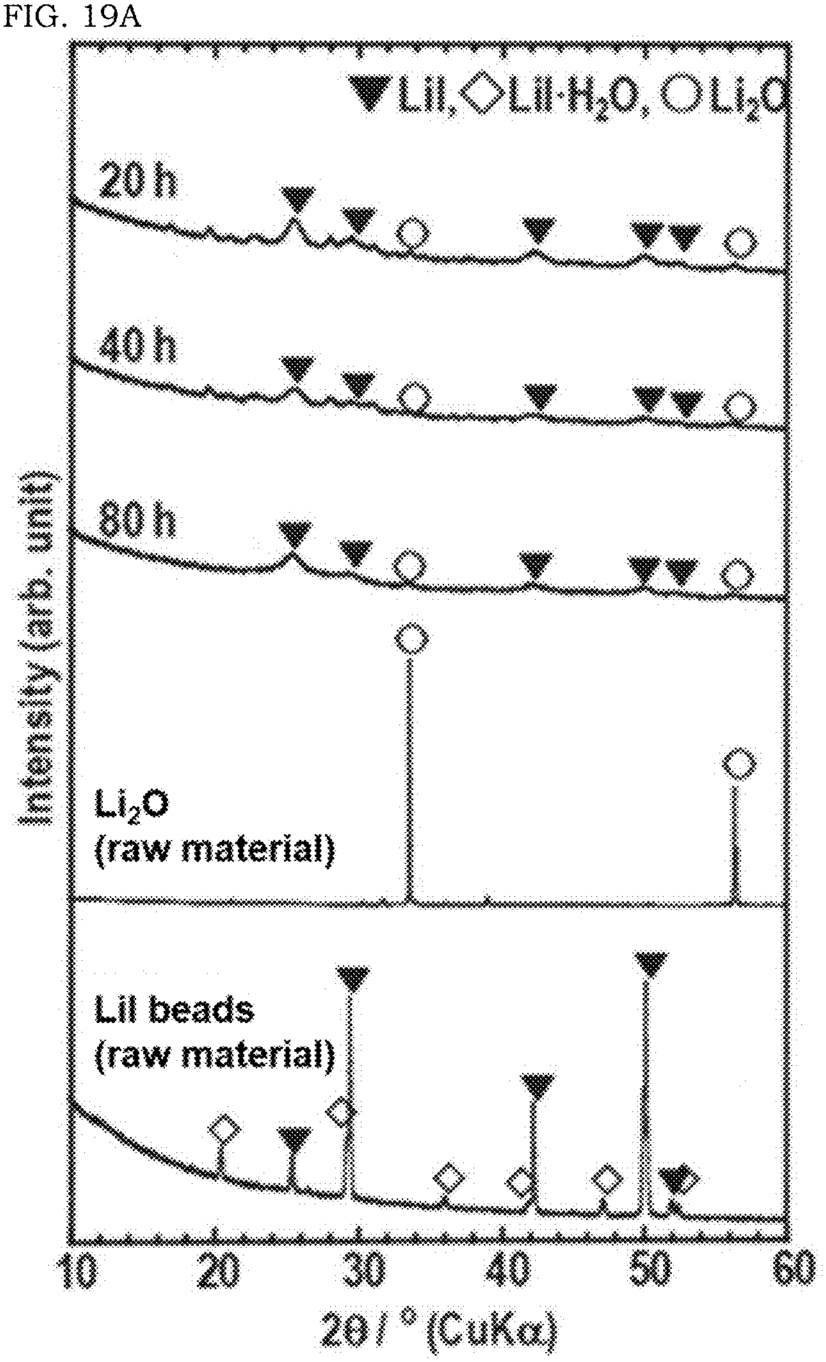
FIG. 19A shows XRD patterns of $50Li_2O{\cdot}50LiI$ prepared by changing the rotation conditions.
Figure 19B:
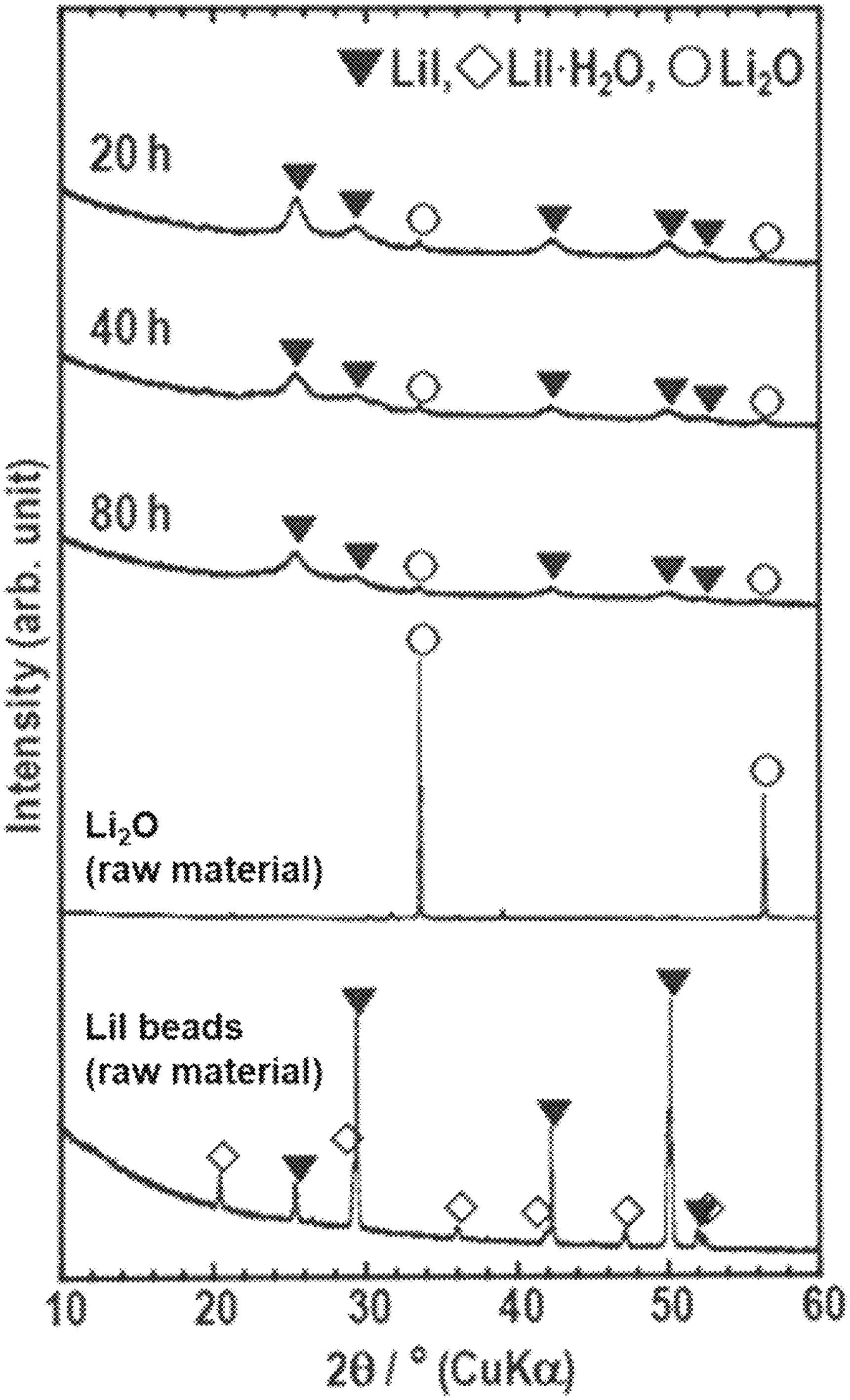
FIG. 19B shows XRD patterns of $50Li_2O{\cdot}50LiI$ prepared by changing the rotation conditions.
Figure 19C:
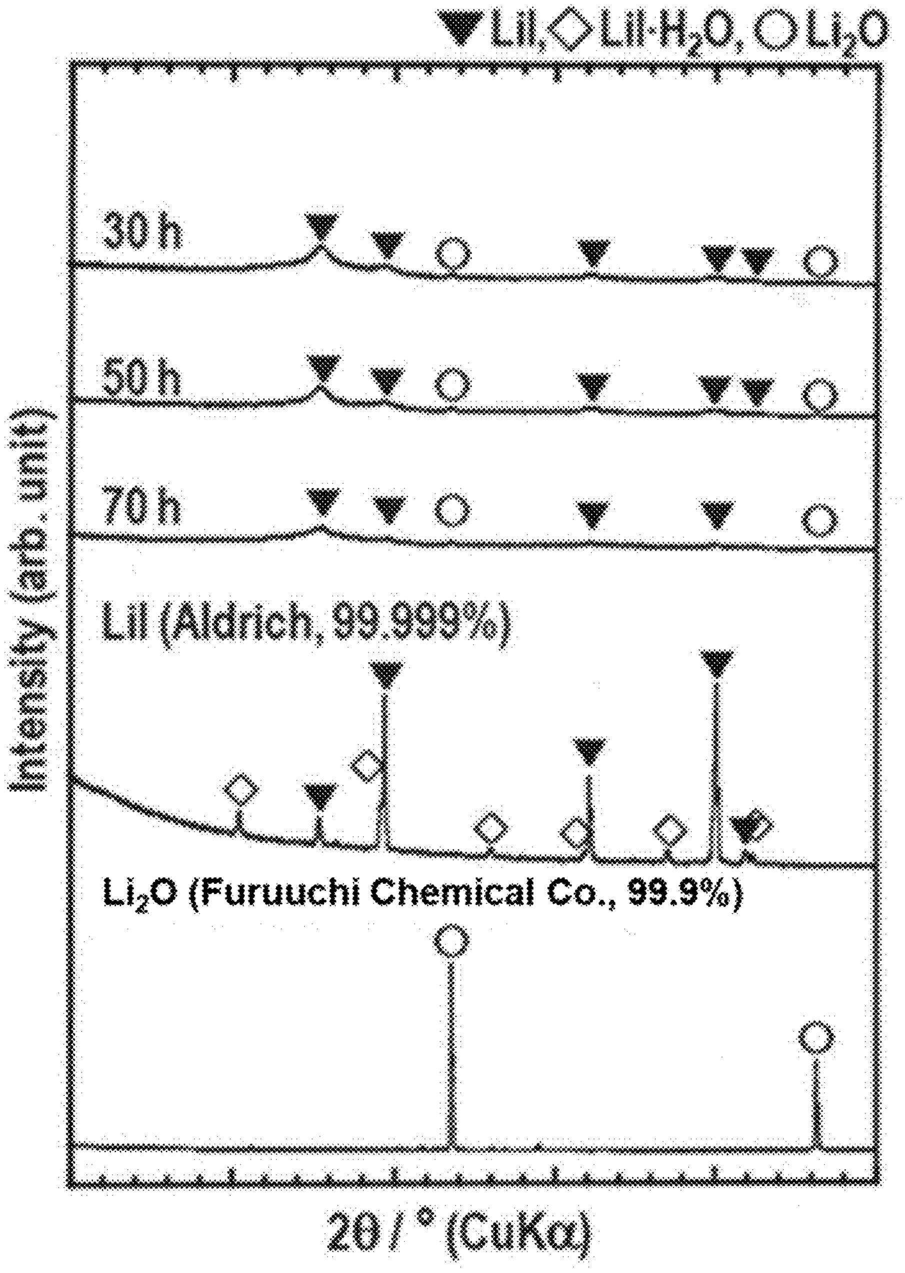
FIG. 19C shows XRD patterns of $50Li_2O{\cdot}50LiI$ prepared by changing the rotation conditions.

FIG. 19A to 19C show the results of XRD tests performed on tested samples. FIG. 19A shows the result of test A, FIG. 19B shows the result of test B, and FIG. 19C shows the result of test C. FIGS. 19A to 19C show that there is no significant difference in the results of the respective tests, and that the rotation speed does not have a significant influence on the preparation of the ion conductor.

Example 6

(Electrochemical Measurement of 66.7$Li_2O$·33.3LiI)

Using the above 66.7$Li_2O$·33.3LiI sample, electrochemical measurement was performed and the dissolution and precipitation characteristics of Li were evaluated.

(1) Evaluation of Dissolution and Precipitation Characteristics of Li

A symmetric cell was prepared by the following procedure.

Figure 20:
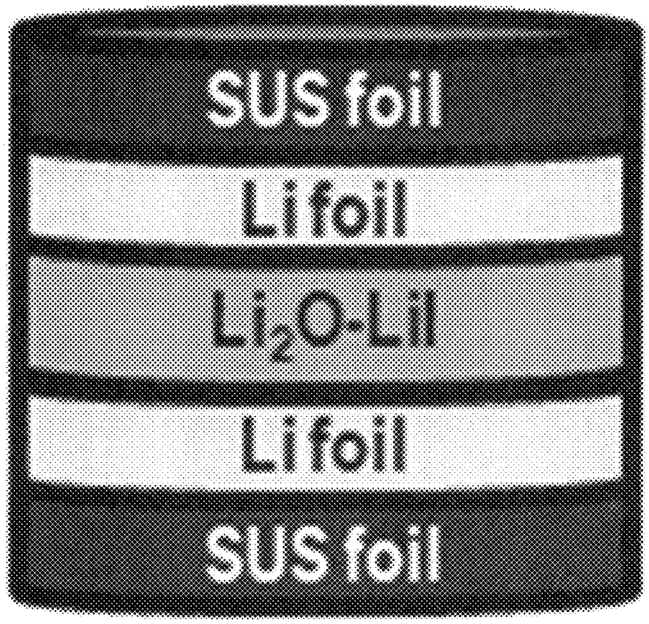
FIG. 20 is a schematic diagram of a $66.7Li_2O{\cdot}33.3LiI$ symmetric cell.

A pellet was prepared by molding the $66.7Li_2O{\cdot}33.3LiI$ powder sample by uniaxial pressing at 360 MPa for 5 minutes using a hydraulic press in a glove box. A Li foil having a film thickness of 250 μm was attached to both sides of the pellet. A SUS foil having a film thickness of 20 μm and a diameter of 10.0 mm was further attached to both sides of the pellet. This was vacuum-sealed in an aluminum laminate film having a thickness of 150 μm (50 μm of which was an aluminum evaporated film). Thereafter, cold isostatic pressing (CIP) was performed at 80 MPa for 2 minutes to prepare a $66.7Li_2O{\cdot}33.3LiI$ symmetric cell. A schematic diagram of the prepared $66.7Li_2O{\cdot}33.3LiI$ symmetric cell is shown in FIG. 20.

A constant current cycle test was performed using the prepared $66.7Li_2O{\cdot}33.3LiI$ symmetric cell. In the cycle test, the test temperature was 100° C., and the current was applied with one hour each of charging and discharging used as one cycle and with the current density increased from 0.064 mA $cm^{-2}$ every five cycles until the symmetric cell was short-circuited.

The interface between Li and $66.7Li_2O{\cdot}33.3$ LiI after short-circuiting was observed by the SEM. At this time, the working distance of the SEM was 8.5 mm, and the applied voltage was 1 to 10 kV. For the measurement of the interface, the Li metal foil was peeled off from the pellet after Li dissolution and precipitation, the symmetric cell was fractured perpendicularly to the stacking plane, and the fractured section was observed.

Figure 21A:
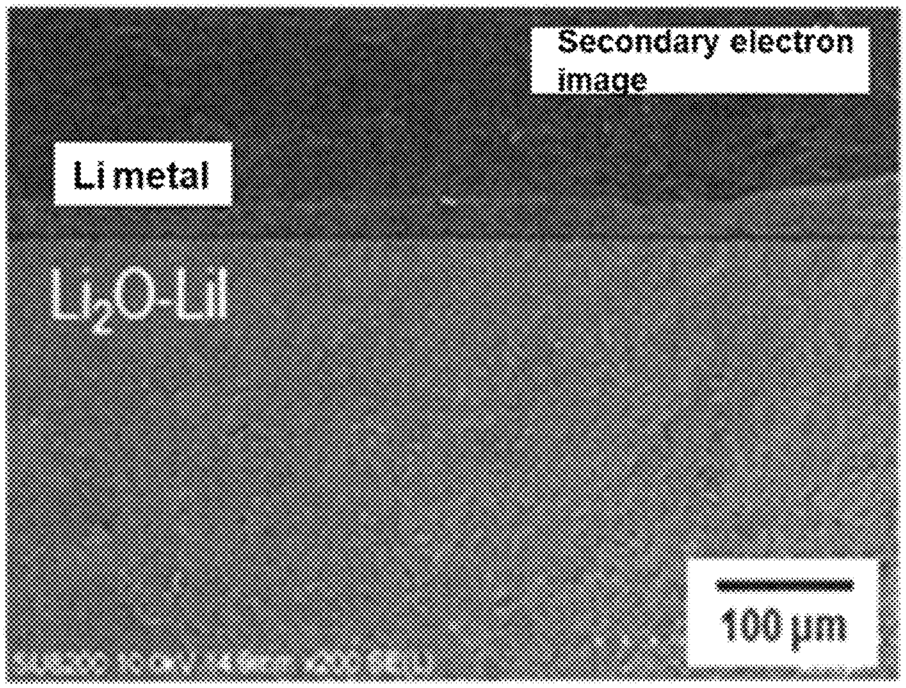
FIG. 21A is an example of a SEM image of $66.7Li_2O{\cdot}33.3LiI$ after a constant current cycle test.
Figure 21B:
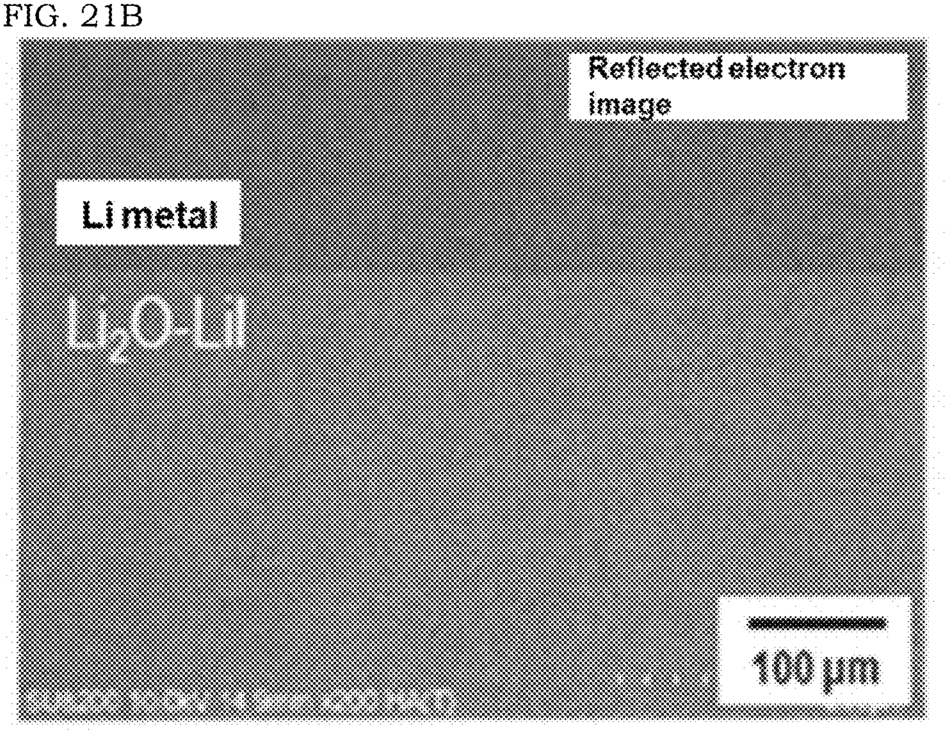
FIG. 21B is an example of a SEM image of $66.7Li_2O{\cdot}33.3LiI$ after a constant current cycle test.
Figure 21C:
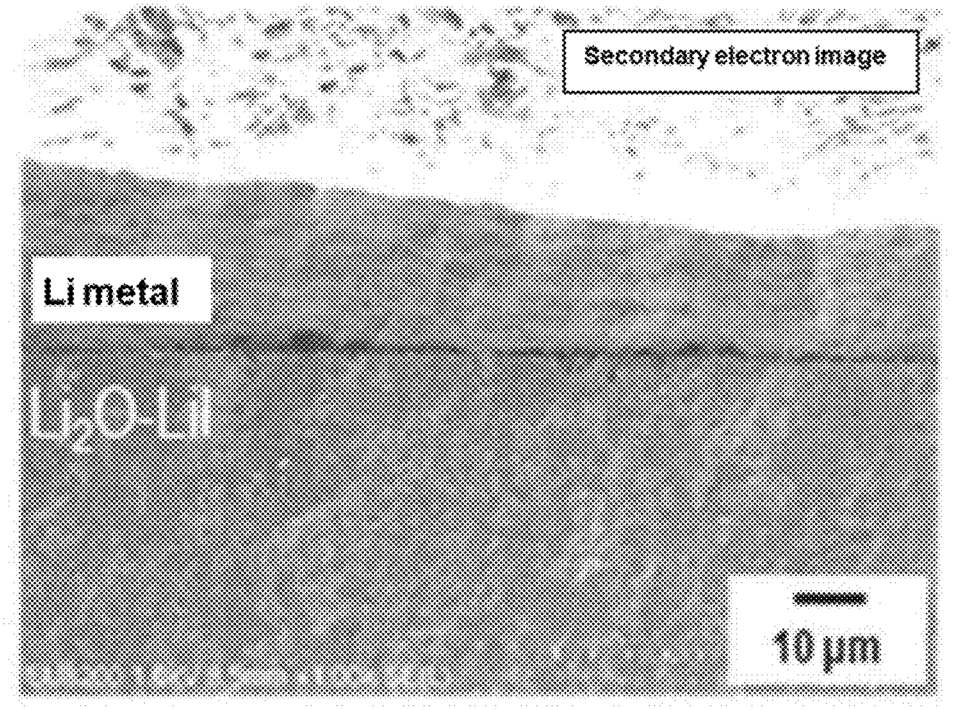
FIG. 21C is an example of a SEM image of $66.7Li_2O{\cdot}33.3LiI$ after a constant current cycle test.
Figure 21D:
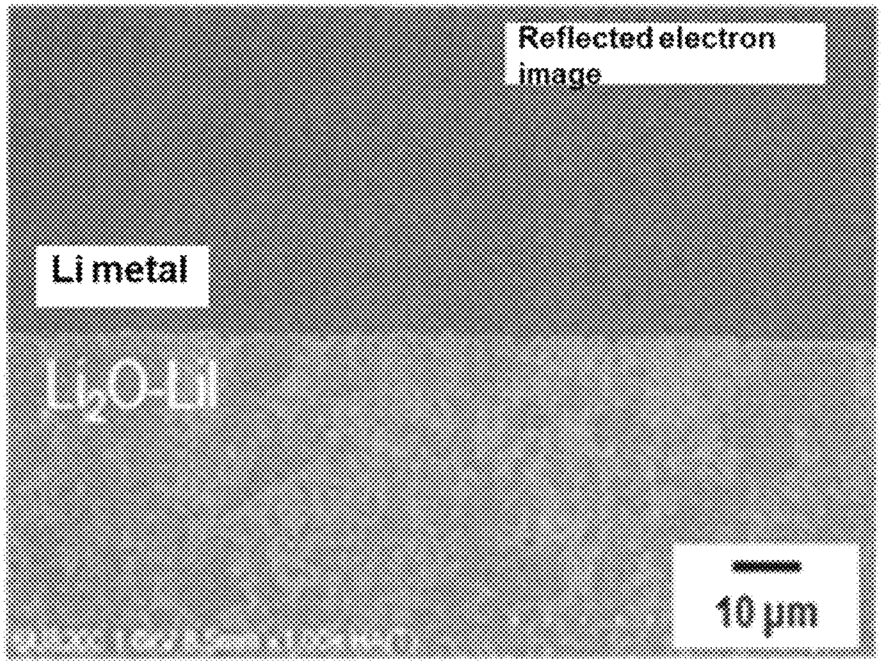
FIG. 21D is an example of a SEM image of $66.7Li_2O{\cdot}33.3LiI$ after a constant current cycle test.

The results of observation by the SEM are shown in FIGS. 21A to 21D. FIGS. 21A and 21B show examples of a secondary electron image and a reflected electron image of the interface measured at 200× and an acceleration voltage of 10 kV, and FIGS. 21C and 21D show examples of a secondary electron image and a reflected electron image of the interface measured at 1000× and an acceleration voltage of 1 kV. From FIGS. 21A to 21D, it was found that no large growth of Li dendrites and no clear reaction product were observed at the interface, indicating that a good interface was formed.

Figure 22:
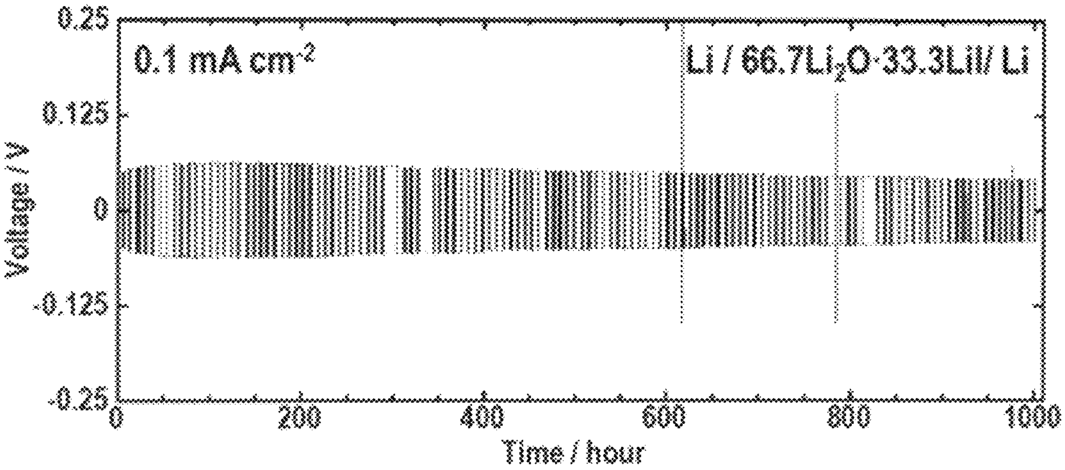
FIG. 22 shows a result of a constant current cycle test using a $66.7Li_2O{\cdot}33.3LiI$ symmetric cell.

A constant current cycle test was performed on the prepared $66.7Li_2O{\cdot}33.3$ LiI symmetric cell in the same manner as described above, except that the current was fixed at 0.1 mA $cm^{-2}$. The result is shown in FIG. 22. It can be seen from FIG. 22 that the $66.7Li_2O{\cdot}33.3$ LiI symmetric cell operates stably even after 1000 hours of charging and discharging.

(2) Preparation of all-Solid-State Secondary Battery Using $66.7Li_2O{\cdot}33.3LiI$-VGCF An all-solid-state secondary battery was prepared by the following procedure.

(Preparation of $66.7Li_2O{\cdot}33.3LiI$-VGCF)

0.2500 g of the $66.7Li_2O{\cdot}33.3LiI$ powder sample and 0.0500 g of vapor-phase-grown carbon fiber (VGCF) (0.3 g in total) were weighed to achieve the weight ratio of 5:1, and mixed in a mortar for about 10 minutes. The mixed sample and $ZrO_2$ balls (4 mm in diameter, 28.8 g) were placed in a $ZrO_2$ pot (45 ml) and subjected to mechanochemical treatment (510 rpm, 10 hours) using the aforementioned planetary ball mill device to prepare a $66.7Li_2O{\cdot}33.3LiI$-VGCF sample. The series of operations were performed in a glove box.

(Preparation of $Li_3PS_4$ Glass Solid Electrolyte Powder)

The solid electrolyte powder used in this experiment was prepared as follows. $Li_2S$ and $P_2S_5$ were put into a $ZrO_2$ pot (250 mL) at a ratio of 75:25 together with $ZrO_2$ balls (4 mm in diameter, 250 g), and subjected to mechanochemical treatment (210 rpm, 70 hours) using the aforementioned planetary ball mill device to prepare a $Li_3PS_4$ glass solid electrolyte powder sample (LPS). The series of operations were performed in a glove box under an argon atmosphere.

(Preparation of All-Solid-State Secondary Battery)

Figure 23:
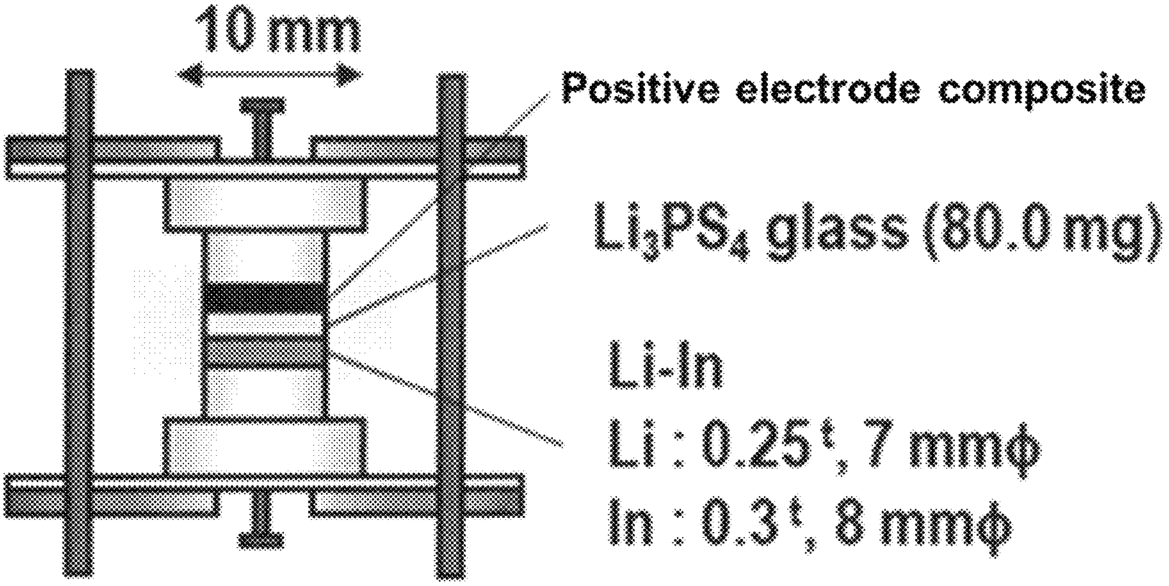
FIG. 23 is a schematic view of an all-solid-state secondary battery using $66.7Li_2O{\cdot}33.3LiI$-VGCF.

80 mg of the above LPS sample was placed in a cylindrical cemented carbide die having a hole with a diameter of 10 mm and lightly pressed. A bilayer pellet of $66.7Li_2O{\cdot}33.3LiI$-VGCF-LPS was prepared by adding about 5.0 mg of $66.7Li_2O{\cdot}33.3LiI$-VGCF on top and uniaxial pressing at 360 MPa for 5 minutes using a hydraulic press. Next, as a negative electrode, an In foil having a diameter of 8 mm (0.30 mm thick, 99.999%) and a Li foil having a diameter of 7 mm (0.25 mm thick, 99.9%) were placed in the cell from the side opposite to the side from which $66.7Li_2O{\cdot}33.3$ LiI-VGCF was added, and subjected to uniaxial pressing at 120 MPa for 2 minutes. Finally, the prepared cell was screwed to obtain an all-solid-state secondary battery. A schematic view of the produced all-solid-state secondary battery is shown in FIG. 23. In the battery using the Li—In alloy as the negative electrode, the molar ratio of the negative electrode is greatly in excess of that of the positive electrode active material; therefore, the capacity of the battery was calculated based on the positive electrode active material.

Figure 24:
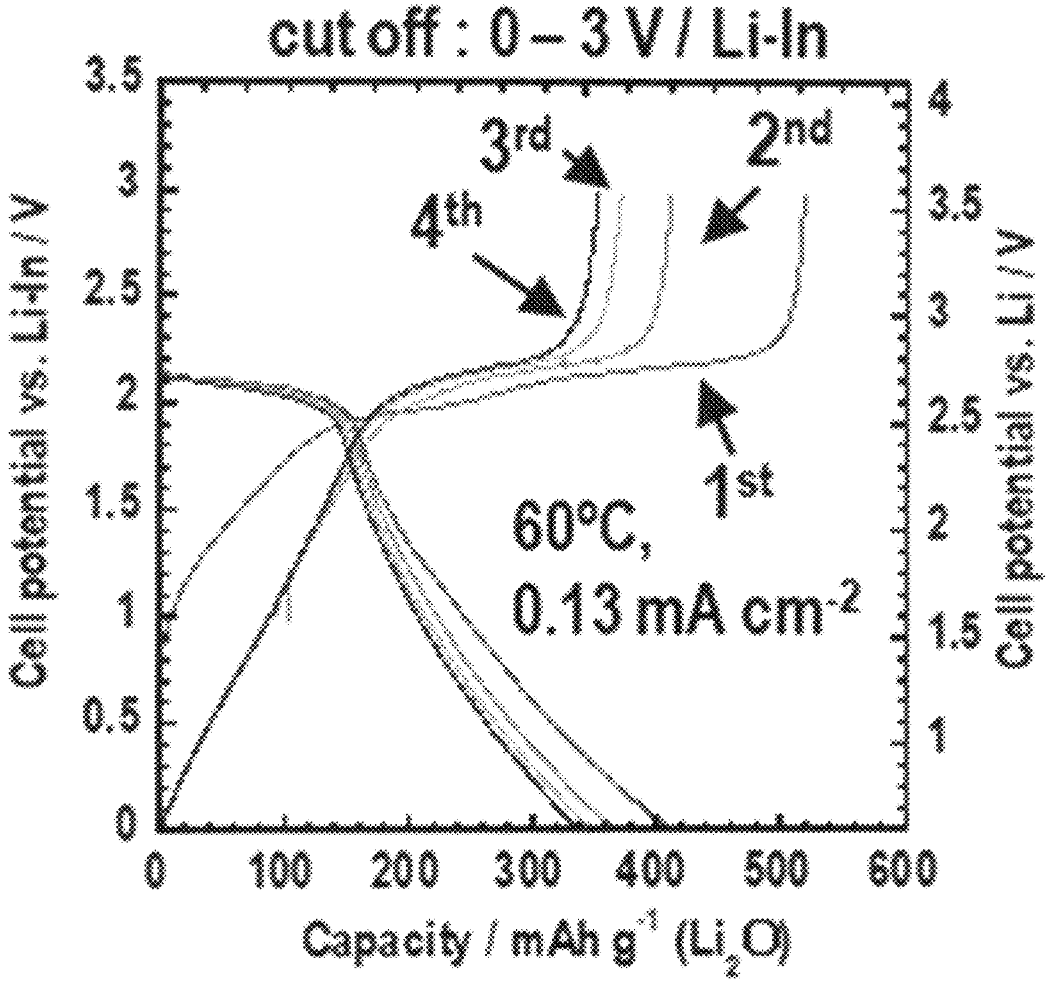
FIG. 24 shows a result of a constant current charge/discharge test of an all-solid-state secondary battery using $66.7Li_2O{\cdot}33.3LiI$-VGCF.

In order to investigate the charge/discharge characteristics of the prepared all-solid-state battery, constant-current charge/discharge measurement was performed. The measurement was performed at 60° C., and the current density was 0.13 mA $cm^{-2}$. The cutoff potential was 0 to 3 V based on Li—In. It can be seen from FIG. 24 that the initial charge capacity was about 500 mAh $g^{-1}$ per $Li_2O$ weight.

(Preparation of Cell Using $50Li_2O{\cdot}50LiI$)

A cell using $50Li_2O{\cdot}50LiI$ was prepared, and AC impedance and DC polarization were measured. The cell using $50Li_2O{\cdot}50LiI$ was prepared as follows.

A pellet was prepared by placing a $50Li_2O{\cdot}50LiI$ powder sample in a cylindrical cemented carbide die having a hole with a diameter of 10 mm and molding the sample by uniaxial pressing at 360 MPa for 5 minutes using a hydraulic press in a glove box. A Li foil having a film thickness of 250 μm and a diameter of 7 mm was placed on both sides of the pellet, and adhered by lightly pressing the Li foil. Finally, a $50Li_2O{\cdot}50LiI$ cell was prepared by crimping the prepared cell with a screw. SKD was used for the current collector constituting the cell, and polycarbonate was used for the insulating material.

Figure 25A:
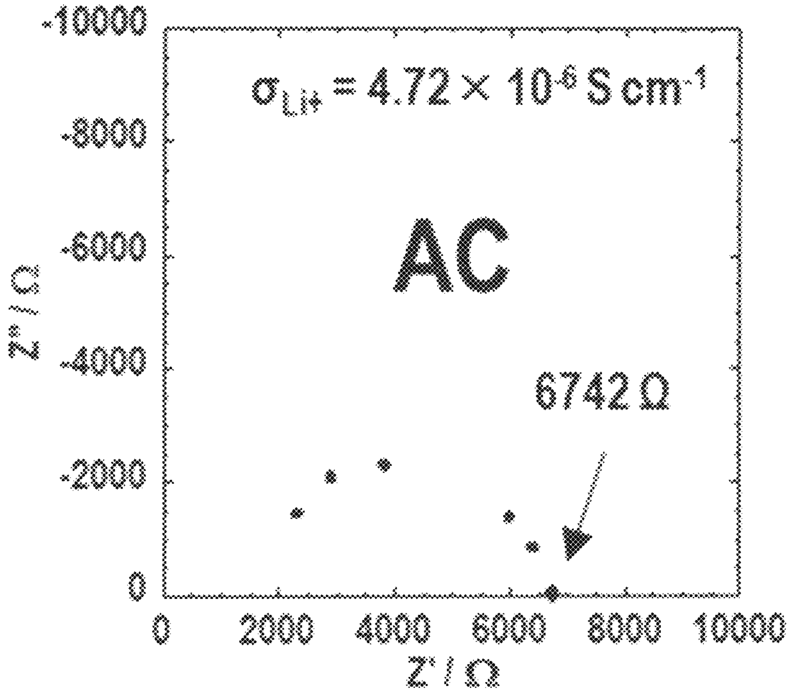
FIG. 25A shows a Nyquist plot of a $50Li_2O{\cdot}50LiI$ cell.
Figure 25B:
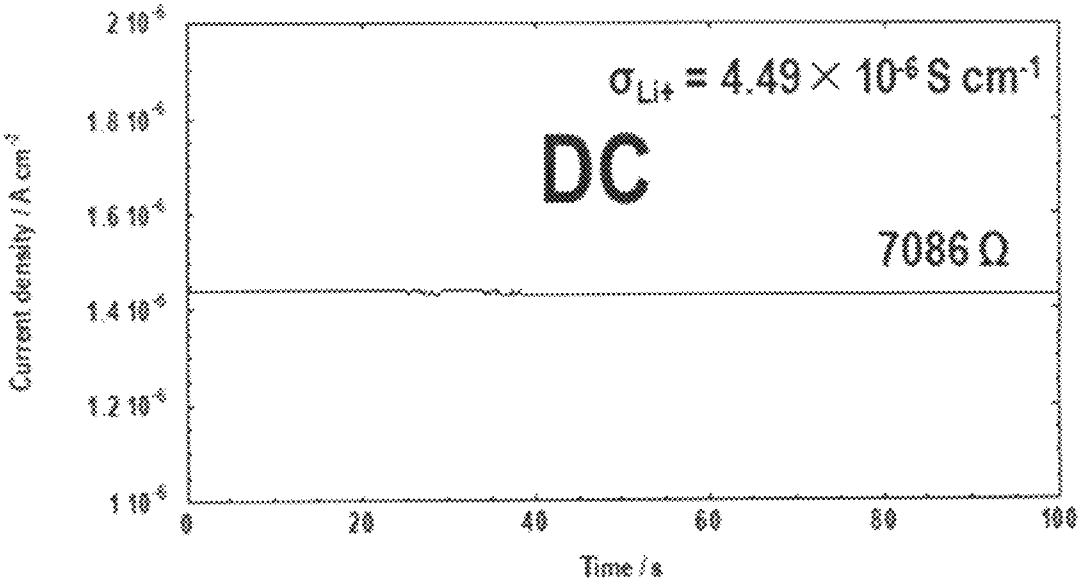
FIG. 25B shows the DC polarization of a $50Li_2O{\cdot}50LiI$ cell.

AC impedance and DC polarization were measured using the prepared $50Li_2O{\cdot}50LiI$ cell. The results are shown in FIGS. 25A and 25B. It can be seen from FIGS. 25A and 25B that the AC and DC resistance values were almost the same, and the ion conductivities were similar.

(Measurement of Amorphous Percentage of $Li_2O{\cdot}LiI$)

The reference intensity ratio (RIR) method was used to measure the amorphous percentage of a $Li_2O{\cdot}LiI$ sample. The measurement was performed as follows.

A mixture obtained by mixing powdered $Al_2O_3$ as a reference sample and a prepared $66.7Li_2O{\cdot}33.3$ LiI (or $50Li_2O.50LiI$) ion conductor in a mortar at a weight ratio of 1:2, and a mixture obtained by mixing $Al_2O_3$, starting material $Li_2O$, and LiI ($Li_2O$:LiI=2:1 molar ratio) in a mortar were each subjected to XRD measurement. The two data items obtained were normalized so that the peak intensities of $Al_2O_3$ would match, the peak intensities of each of $Li_2O$ and LiI were compared, and the percentage of amorphization was calculated from the degree of decrease in intensity. The results are shown in Table 14.

TABLE 14

| | Amorphous (wt %) | $Li_2O$ (wt %) | LiI (wt %) |
|---|---|---|---|
| $66.7Li_2O$•33.3LiI | 77.8 | 20.3 | 1.8 |
| $50Li_2O$•50LiI | 70.3 | 8.4 | 21.3 |

It can be seen from Table 14 that the prepared samples both had a high amorphous percentage exceeding 70%. The composition ratio of $Li_2O$ to LiI in the amorphous part was 41.4 mol %:58.6 mol % in the case of $66.7Li_2O$·33.3LiI, and 47.2 mol %:52.8 mol % in the case of $50Li_2O$·50LiI.

What is claimed is:

1. A noncrystalline ion conductor represented by the following formula:

$$(Li_{2-x}O_{1-x}A_x)_{1-y}Z_y \quad (I)$$

(where A is one or more atoms selected from F, Cl, Br, and I, x satisfies $0.1 \le x \le 0.7$, Z is a network-forming oxide or an intermediate oxide, and y satisfies $0<y\le 0.2$).

2. The noncrystalline ion conductor according to claim 1, wherein the y satisfies $0<y\le 0.15$.

3. The noncrystalline ion conductor according to claim 1, wherein the x satisfies $0.1\le x\le 0.5$.

4. The noncrystalline ion conductor according to claim 1, wherein the network-forming oxide or the intermediate oxide is one or more compounds selected from the group consisting of $Al_2O_3$, $B_2O_3$, $GeO_2$, $SiO_2$, and $V_2O_3$.

5. The noncrystalline ion conductor according to claim 1, wherein the A is I.

6. An all-solid-state secondary battery comprising the solid electrolyte comprising, as a major component, the noncrystalline ion conductor according to claim 1.

7. The noncrystalline ion conductor according to claim 1, wherein A is I.

8. The noncrystalline ion conductor according to claim 1, wherein Z is a network-forming oxide.

9. A noncrystalline ion conductive composite comprising:

a first phase composed of the noncrystalline ion conductor represented by the following formula:

$$(Li_{2-x}O_{1-x}A_x)_{1-y}Z_y \quad (I)$$

(where A is one or more atoms selected from F, Cl, Br, and I, x satisfies $0.1\le x\le 0.7$, Z is a network-forming oxide or an intermediate oxide, and y satisfies $0<y\le 0.2$); and a second phase composed of a crystalline ion conductor having a chemical composition represented by the formula (I).

10. The ion conductive composite according to claim 9, wherein a content of the first phase is 50% by mass or more.

11. The ion conductive composite according to claim 9, wherein the second phase is dispersed in the first phase.

12. An electrode active material comprising, as a major component, the noncrystalline ion conductor according to any one of claims 1 and 2 to 5 or the ion conductive composite according to any one of claims 9 to 11.

13. A method for producing the noncrystalline ion conductor represented by the following formula:

$$(Li_{2-x}O_{1-x}A_x)_{1-y}Z_y \quad (I)$$

(where A is one or more atoms selected from F, Cl, Br, and I, x satisfies $0.1\le x\le 0.7$, Z is a network-forming oxide or an intermediate oxide, and y satisfies $0<y\le 0.2$) or the ion conductive composite according to claim 7, comprising mechanochemically treating lithium oxide $Li_2O$, LiA (where A is synonymous with the A in the formula (I) in claim 1), and optionally one or more oxides Z.

* * * * *